(12) United States Patent
Ogawa

(10) Patent No.: US 7,680,130 B2
(45) Date of Patent: Mar. 16, 2010

(54) METHOD FOR FINDING RESOURCE AND SERVICE IN NETWORK AND RELAY NODE APPARATUS

(75) Inventor: Jun Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1358 days.

(21) Appl. No.: 11/024,174

(22) Filed: Dec. 28, 2004

(65) Prior Publication Data

US 2006/0007942 A1  Jan. 12, 2006

(30) Foreign Application Priority Data

Jul. 9, 2004  (JP) .............................. 2004-203676

(51) Int. Cl.
*H04L 12/28* (2006.01)
(52) U.S. Cl. ...................... 370/400; 370/254; 370/356; 370/389; 370/403; 370/503
(58) Field of Classification Search ......... 370/229–468, 370/477, 503
See application file for complete search history.

(56) References Cited

U.S. PATENT DOCUMENTS

| | | | | |
|---|---|---|---|---|
| 5,521,909 A | * | 5/1996 | Holloway et al. ........... 370/404 |
| 5,638,359 A | * | 6/1997 | Peltola et al. ............... 370/229 |
| 5,727,157 A | * | 3/1998 | Orr et al. ..................... 709/224 |
| 5,825,766 A | * | 10/1998 | Kobayashi et al. ..... 370/395.64 |
| 5,889,762 A | * | 3/1999 | Pajuvirta et al. ............ 370/230 |
| 5,953,312 A | * | 9/1999 | Crawley et al. ............. 370/218 |
| 5,970,048 A | * | 10/1999 | Pajuvirta et al. ............ 370/230 |
| 6,219,349 B1 | * | 4/2001 | Kobayashi et al. ....... 370/395.6 |
| 6,647,008 B1 | * | 11/2003 | Galand et al. ............... 370/389 |
| 7,209,480 B2 | * | 4/2007 | Ikeda ......................... 370/389 |
| 7,324,552 B1 | * | 1/2008 | Galand et al. ............... 370/468 |
| 7,327,683 B2 | * | 2/2008 | Ogier et al. ................. 370/236 |
| 7,464,166 B2 | * | 12/2008 | Larsson et al. ............. 709/228 |
| 7,522,617 B2 | * | 4/2009 | Ogawa ....................... 370/401 |
| 2002/0080752 A1 | * | 6/2002 | Johansson et al. .......... 370/338 |
| 2002/0143855 A1 | * | 10/2002 | Traversat et al. ........... 709/202 |
| 2004/0008687 A1 | * | 1/2004 | Matsubara ............. 370/395.21 |
| 2004/0114595 A1 | * | 6/2004 | Doukai ........................ 370/389 |
| 2004/0172399 A1 | * | 9/2004 | Saffre ......................... 707/100 |
| 2004/0233849 A1 | * | 11/2004 | Cole ........................... 370/238 |
| 2005/0028012 A1 | * | 2/2005 | Amamiya et al. ........... 713/201 |

FOREIGN PATENT DOCUMENTS

JP    10-070552    3/1998
JP    2001-203739    7/2001

* cited by examiner

*Primary Examiner*—Ayaz R. Sheikh
*Assistant Examiner*—Venkatesh Haliyur
(74) *Attorney, Agent, or Firm*—Fujitsu Patent Center

(57) ABSTRACT

In a method for finding a resource and a service conducted in each of relay node relaying a frame, a search table is maintained to register more than one node providing a resource or a service, when an access request including an identification identifying the resource or the service, which the node stops providing, is received, a next transfer node is switched from the node, which stops providing the resource or the service, to an available node providing the resource or the service identified by the identification, by searching for the search table by the identification.

7 Claims, 16 Drawing Sheets

METHOD FOR FINDING RESOURCE AND SERVICE IN NETWORK AND RELAY NODE APPARATUS

BACKGROUND OF THE INVENTION

1. Field of the Invention

The present invention generally relates to methods for finding a resource and a service in network and relay node apparatuses, and more particularly to a method for finding a resource and a service in network and a relay node apparatus, in which a plurality of nodes provides resources and services maintained thereby.

2. Description of the Related Art

Conventionally, the Internet is a network mainly for personal computers (PCs) and workstations. Recently, accompanying with an evolution of minimized information terminals including a mobile phone and wide use of state-of-the-art IC chips, a communication called a ubiquitous communication that can communicate to any terminal anywhere and anytime, regardless of a type of a terminal is attracting attention as a communication form for the next generation.

In a network in which various nodes are mutually connected, since the number of resources and services and an amount of resources and services provided by various nodes becomes greater, a mechanism to effectively find a resource and a service becomes important. In a scope of this specification and claims, a resource means the resource included in hardware or a memory of any node, and a service means an intangible material provided by combining resources so as to bring a benefit to a user.

In the ubiquitous communication, requirements needed to find a resource or a service maintained by each node will be shown as follows:

A first requirement is to find a resource and a service maintained by any node. Conventionally, a client/server model, which defines a clear distinction between one node providing the resource and the service and another node receiving the resource and the service form the one node, is mainly applied. Accordingly, a technology for searching for a server as a search subject to receive the service and the resource has been widely used. For example, a conventional search engine for searching for homepages targets a Web server to implement. However, in the ubiquitous network, it is not easy to simply define a clear distinction between nodes such as in the client/server model. Thus, it is required to find the resource and the service provided by any node.

A second requirement is to have scalability with respect to the number of nodes. In the ubiquitous network, a node connected to a network is not limited to a PC (Personal Computer) but can be a node having an IC chip. Thus, a technology having scalability with respect to the number of nodes is required.

A third requirement has a lower load with respect to the network in a process for finding the resource or the service through the network. It is difficult to provide a bandwidth of the network proportional to the enormous number of nodes in a ubiquitous communication. Thus, it is required to suppress the load to the network in the process for finding the resource or the service through the network.

A fourth requirement is to have a fault-tolerance. In the ubiquitous communication, not only nodes securing sufficient reliability such as a conventional server provides the resource and the service. Thus, it is required to be a technology based on the premise that there is a node which cannot provide the resource and the service stably for a long time (for many days) since a connection to the network and an OS of the node are not stable.

A fifth requirement is to support a plurality of nodes providing the same resource or the same service. In the ubiquitous communication, the plurality of nodes may provide the same resource or the same service. Thus, it is required to select one node from a node group providing the same resource or the same service and provide a user a search result.

Existing search technologies for searching for resources and services are classified into as follows:

A centralization type is a search technology in that any node collects information concerning resources and services provided by any server and manages in a database beforehand, and the resources and the services are found. In general, a node called "search site" or "search engine" collects the information concerning the resources and the services. A search site searches for the database by using a keyword input by a user, provides information concerning nodes publishing the resources and the services related to the keyword. It should be noted that the centralization type is a type of a registration of a node providing the resource and the service, and can be classified into a robot type or a manual type.

The robot type is a search technology in that a server autonomously collects information concerning the resources and the services in the network by using a program called "robot".

The manual type is a search technology in that the user or a server administrator for a search registers a location identification identifying a location of each of the resources and the service to a server managed by the server administrator and a keyword related thereto.

A distribution type is a search technology to inquire nodes in the network for each inquiry which node has the resource and the service. The distribution type does not require any database such as the centralization type. The distribution type is mostly used by a file sharing application such as Gnutella™, WinMix™, and a like. Since the resource and the service provided by any node can be searched from any node, the distribution type is called a peer-to-peer type (PtoP type).

A hybrid type is a search technology positioned between the centralization type and the distribution type, and periodically exchanges the resource and the service published by each node between nodes. In the distribution type, it is difficult to satisfy the first requirement previously described. Accordingly, the following discussion will focus on the distribution type and the hybrid type.

A procedure for finding the resource and the service in the distribution type has not been standardized. In practice, most applications of the distribution type are based on a procedure of Gnutella™. Thus, in the following, an operation example of Gnutella™ will be shown.

Gnutella™ is application software for exchanging files individually through the network. Thus, in Gnutella™, the resource and the service is handled as a file. PCs of users of Gnutella™ are mutually connected through the network, and each user opens a list of files to share with other users through the network. In a case of searching for a file on Gnutella™, files opened by nodes other than its own node and meeting a condition are extracted, and then the own node searching for the file can download the file as the resource directly from a node having the file as the resource.

The procedure for finding the resource and the service in the distribution type will be described with reference to FIG. 1. When a query as a request for finding a file is sent to a host computer connected to the network, the query (request) is sequentially relayed to a next neighbor node. A host computer having the file being a requested subject replies a hit response. Then, it is realized to find the file.

In FIG. 1, (1) A query command for finding a file is sent to a neighbor node.

(2) This query command (simply called query) is sequentially relayed to a next neighbor node.

(3) A node having the file replies with a hit response.

(4) The hit response is sequentially traversed in accordance with a reversed path of the query, and responds to a node being a sender of the query.

(5) The node being the sender of the query connects to any one of nodes that reply with the hit response, in accordance with TCP (Transmission Control Protocol).

(6) The node being the sender of the query sends a request for obtaining the file.

(7) Contents of the file is transmitted to the node being the sender of the query.

In the above (2), in order to prevent from relaying the query infinitely, since Gnutella™ includes a concept of TTL (Time To Live) as well as IP (Internet Protocol), the query is discarded after the query is transferred to a next neighbor node more than or equal to a predetermined number of nodes.

It is realized to find the resource or the service in Gnutella™ by broadcasting the query by a bucket brigade. Thus, the following problems are raised.

Problem 1: the number of nodes to search is enormous. The number of nodes searching for the resource or the service is increased in geometrical progression. This problem is caused because information concerning the resource or the service provided by nodes is not exchanged to each other among the nodes. As a result, in a case in that a node receiving the query does not have the resource or the service as a search subject, since the node does not have information showing to which neighbor node the query is transferred, it is needed to broadcast all over the neighbor nodes in the network. Accordingly, the second requirement is not satisfied.

Problem 2: a bandwidth of the network is used unnecessarily. The query is broadcast to neighbor nodes and then the number of nodes to broadcast the query is increased in geometrical progression for each path to the neighbor nodes. However, the node originally sending the query sends the request for obtaining the file (obtain command) to one node at most, and other queries (for example, queries toward bottom three nodes of four nodes at a right side in FIG. 1) unnecessarily consume the bandwidths of the network. Thus, the third requirement is not satisfied.

Problem 3: a mechanism of the fault tolerance is not implemented. Thus, the fourth requirement is not satisfied.

The hybrid type has a feature of periodically exchanging information concerning the resource and the service provided by each of the nodes. Since there is no standard in an actual state, an operation example of the hybrid type will be shown by Flapps (Forwarding Layer for Application-level Peer-to-Peer Services) offered by UCLA (University of California, Los Angeles) in U.S.A.

The hybrid type exchanges "name" (file name, URL (Uniform Resource Locator), and a like) of the resource and the service opened by the node and path information toward the node among nodes. Based on a result of a path exchange, each of the nodes transmits the resource or the service requested by a query to a node sending the query.

Two phases are included in finding the resource and the service in the hybrid type. A first phase is a phase of distributing identification of the resource or the service (hereinafter, called name path information). A second phase is a phase of finding the resource and the service based on a request sent from a node.

FIG. 2 is a diagram showing a sequence flow for explaining a distribution phase of the name path information according to the present invention. First, an environment being assumed will be described. Both a node B and a node C open a file (resource) called "resource/music/rock.mp3". A node A, the node B, the node C, and relay nodes 1 through 6 are mutually communicable by indicating an IP address. The relay node may be a terminal such as a PC or may be a network device such as a router to which an additional function is provided. The name path information is exchanged periodically among the nodes A, B, and C, and the relay nodes 1 through 6. In sequence flows after FIG. 2, "IP-A" represents an IP address of the node A, and IP addresses of the other nodes are represented in the same manner. The name path information exchanged between the nodes is described in an order of a source IP, a destination IP, a command name, a resource name, and a next hop IP.

In FIG. 2, (1) The node C sends a frame showing that a resource identified by "resource/music/rock.mp3" is opened, to a neighbor node (relay node 5) ((1) in FIG. 2).

(2) The relay node 5 identifies "name path information" from a command name of the frame being received, decomposes a character string of the resource name by each delimiter ("/" in this case) that is defined beforehand, and creates a search tree. After that, the relay node 5 informs a neighbor node (relay node 4) that the relay node 4 can achieve "resource/music/rock.mp3" by passing through the relay node 5 itself, that is, the relay node 4 can achieve a node (node C) opening "resource/music/rock.mp3" by transferring a query sent from any node toward the relay node 5 ((2) in FIG. 2).

(3) A process of the relay node 4 is the same as that described in (2) ((3) in FIG. 2).

(4) Similar to (1), the node B informs the relay node 6 being a neighbor node that the node B opens "resource/music/rock.mp3" ((a) in FIG. 2). Also, similar to (2), after the relay node 6 creates the search tree, the relay node 3 informs the name path information to the relay node 3 ((b) in FIG. 2).

(5) The relay node 3 receives the name path information concerning "resource/music/rock.mp3" from both the relay nodes 4 and 6. As a result, the search tree showing IP-6 and IP-4 as a search result as shown in FIG. 2 is created in the relay node 3. The relay node 3 determines to select IP-6 or IP-4 as the search result by using an algorithm (not shown) (for example, select alternately).

(6) In the following, the relay node 3 and relay node 2 conduct a process similar to (2), so that the name path information is relayed to the relay node 2 and then to the relay node 1 ((4) and (5) in FIG. 2).

As described above, each name of the resources opened by the node B and the node C and the path information are exchanged among the relay nodes 1 through 6.

Next, a sequence flow of a find phase of the service is shown in FIG. 3.

In FIG. 3:

(1) The node A sends a query frame for requesting to find a node having "resource/music/rock.mp3" to the network ((1) in FIG. 3).

(2) The relay node 1 identifies "query" from the command name of the frame being received, decomposes a character string of the resource name for each delimiter ("/" in this case) which is defined beforehand, and searches for the search tree in an order of keys obtained by decomposing the resource name.

(3) A next hop shown by a search result is the relay node 3. Thus, the relay node 1 transfers the query toward the relay node 2.

(4) The relay node 2 conducts a process similar to that described in (2) and (3), and transfers the query toward the relay node 3.

(5) The relay node 3 conducts a process similar to that described in (2). In this case, there are the relay nodes 4 and 6 as a next hop. The relay node 3 selects one of the relay nodes 4 and 6 by using an algorithm (not shown) (for example, select alternately). It is assumed that the relay node 3 selects the relay node 6. The relay node 3 conducts a process similar to that described in (3), and transfers the query toward the relay node 6 ((4) in FIG. 3).

(6) The relay node 6 conducts a process similar to that described in (2) and (3), and transfers the query toward the node B ((5) in FIG. 3).

(7) Since the node B has "resource/music/rock.mp3" as the resource being a find subject in itself, the node B identifies a "sender node IP" field, establishes a TCP connection to IP-A (node A), and stars a file transfer ((6) in FIG. 3).

Japanese Laid-open Patent Application No. 10-70552 discloses that a node sends a reply packet showing a correspondence between its own closed address and its own extended address with respect to a node which generated an information packet, and the node which generated an information packet includes contents of the replay packet received from the node which sent the relay packet, into its own routing table. Thus, a routing table for routing by the extended address can be generated.

Moreover, Japanese Laid-open Patent Application No. 2001-203739 discloses a path search frame is generated by using an address of the unknown destination and an own address of a relay apparatus when a receive frame shows an unknown destination, and the received frame is sent toward a sender sending a response frame when the response frame being replied from the relay apparatus which finds a destination in response to the path search frame is received.

The hybrid type conducts the find procedure for finding the resource and the service being distributed by exchanging information (name path information) concerning the resource and the service maintained in each node. Thus, when a state of providing the resource or the service by the node is changed (for example, when it becomes impossible to provide the resource or the service), the find procedure for finding the resource and the service cannot be provided stably in the network until the name path information for informing this change is transferred to a relay node group.

That is, a part of the relay group is not informed that the resource or the service is not provided and another part of the relay group is informed. As a result, an inconsistency of the name path information occurs, that is, the network becomes unstable, hereinafter, called "unstable state". As described above, the unstable state may occur in the ubiquitous communication that does not ensure stability of the node.

In the network under the unstable state, the query frame might have been already distributed to a node that does not provide the resource or the service (hereinafter, called "closed node"), and the query frame may not be arrived to a node that provides the resource or the service. Hereinafter, a frame that is not distributed to the node providing the resource or the service is called "not-arrived frame". There are problems to be solved as follows:

Problem 1 to be solved: as an objective to eliminate the not-arrived frame, the network is required to autonomously detect a path toward the closed node and to transfer the query frame being sent to the closed node toward another node.

Problem 2 to be solved: as another objective to suppressing the unstable state, it is needed to inform each of the relay nodes that a node becomes the closed node, without waiting a periodical name path exchange.

SUMMARY OF THE INVENTION

It is a general object of the present invention to provide methods for finding a resource and a service in network and relay node apparatuses, in which the above-mentioned problems are eliminated.

A more specific object of the present invention is to provide a method for finding a resource and a service in network and a relay node apparatus, in which an access request being sent to a closed node that stops providing a resource or a service can be transferred to another node providing the same resource or the same service, and information showing that one node becomes the closed node can be informed to each relay node.

The above objects of the present invention are achieved by a method for finding a resource and a service conducted in each of relay node relaying a frame, including: maintaining a search table to register more than one node providing a resource or a service; receiving an access request including an identification identifying the resource or the service, which the node stops providing; and switching from the node, which stops providing the resource or the service, to an available node providing the resource or the service identified by the identification, by searching for the search table by the identification, wherein resources and services are opened in public and managed by the plurality of nodes, the identification identifying each of the resources and the services and a network address of each of the nodes opening the resources or the services are exchanged among relay nodes relaying the identification and the network address, wherein each of the relay nodes structures a search table, searches for the search table by the identification indicated in the access request when the access request for obtaining a desired resource or a desired service using the identification is received from a request node, and accesses the available node providing the desired resource or the desired service.

According to the above invention, it is possible to transfer the access request being sent to the closed node that stops providing the resource or the service, to another node that is available to provide the same resource or the same service.

In the method, information showing that a node providing the resource or the service stops providing the resource or the service may be additionally included in the access request, each of the relay nodes may be informed by the access request that a node providing the resource or the service stops providing the resource or the service, so that each of the relay nodes changes the search table.

According to the above invention, it is possible to inform each of the relay nodes that the node stops providing the resource or the service, instead of waiting for a periodical exchange of the identification.

The above objects of the present invention are achieved by a relay node apparatus, including: a return check field updating part writing a return instruction for switching from a node to an available node providing a resource or a service in order to transfer an access request when a search result is not obtained by searching for a search table in response to the access request since the node stops providing the resource or the service; an address stacking part stacking an own address of the relay node apparatus itself when the access request that does not including a return instruction is transferred; and a stack address extracting part extracting a transfer originator from which a received access request including the return instruction is transferred, from the received access request stacking the transfer originator, wherein resources and services are opened in public and managed by the plurality of nodes, the identification identifying each of the resources and the services and a network address of each of the nodes opening the resources or the services are exchanged with other relay node apparatuses relaying the identification and the network address, wherein the relay nodes apparatus structures a search table, searches for the search table by the identification indicated in the access request when the access request for obtaining a desired resource or a desired service using the identification is received from a request node, and accesses the available node providing the desired resource or the desired service.

According to the above invention, it is possible to transfer the access request being sent to the closed node that stops providing the resource or the service, to another node providing the same resource or the same service.

The relay node apparatus may further include a return originator address updating part writing the own address as a return originator address when the access request including the return instruction.

The relay node apparatus may further include a table controlling part deleting the return address shown in the access request including the return instruction from the search table.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

An embodiment according to the present invention will be described with reference to the accompanying drawings.

Figure 1:
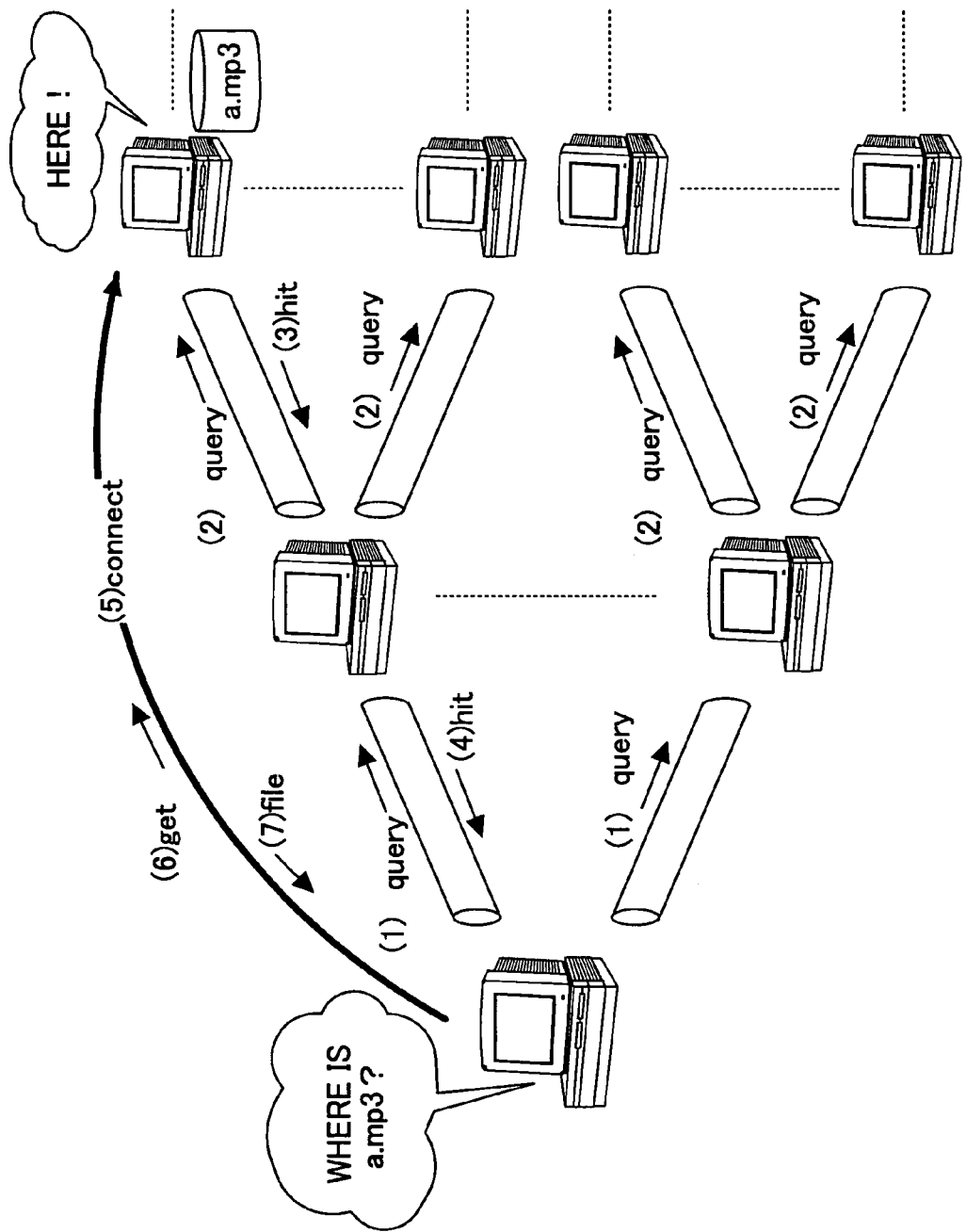
FIG. 1 is a diagram for explaining one example of a find procedure for finding a resource and a service in a distribution type.
Figure 2:
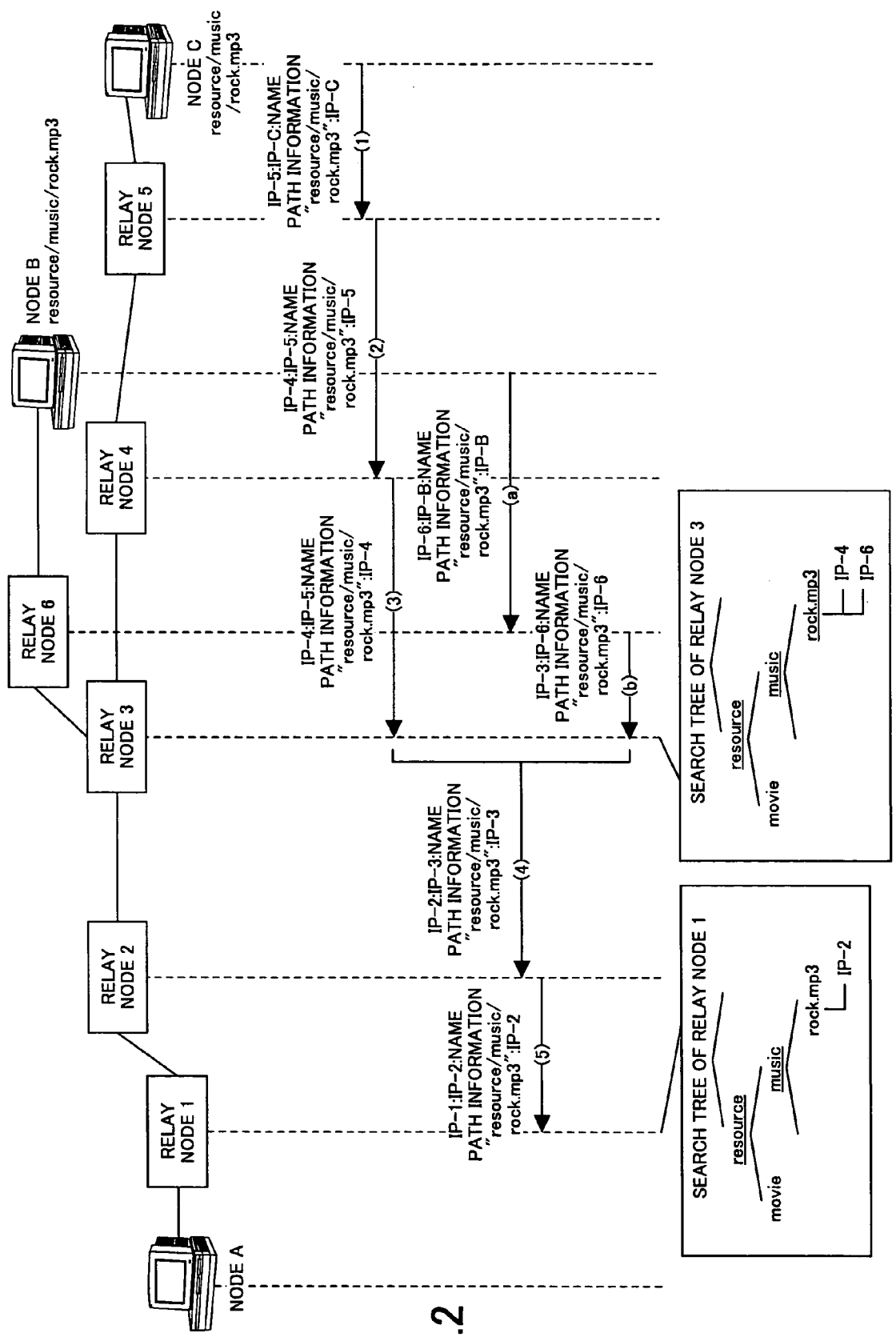
FIG. 2 is a diagram showing a sequence flow for explaining a distribution phase of name path information.
Figure 3:
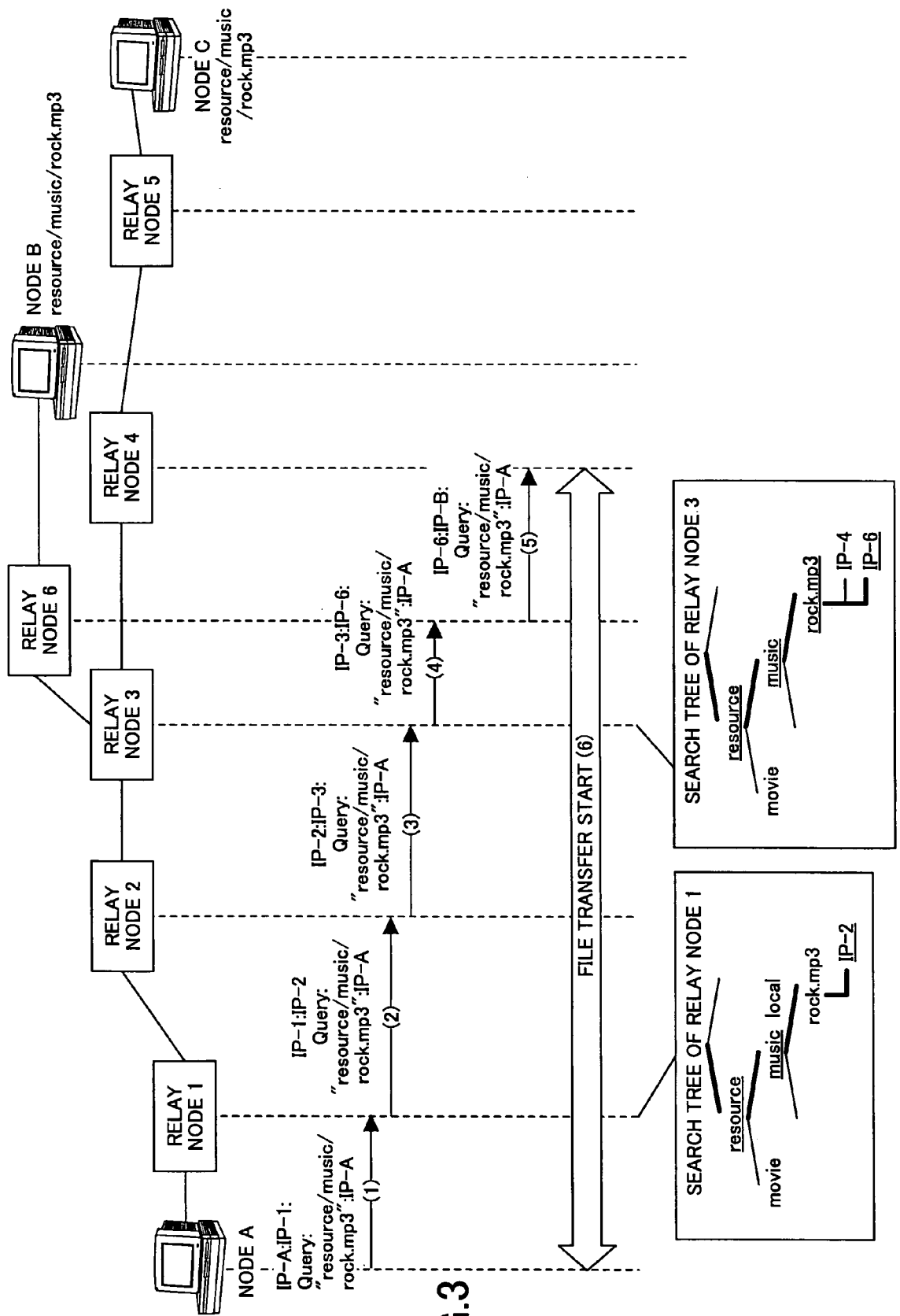
FIG. 3 is a diagram showing a sequence flow for explaining a find phase for finding the resource and the service.
Figure 4:
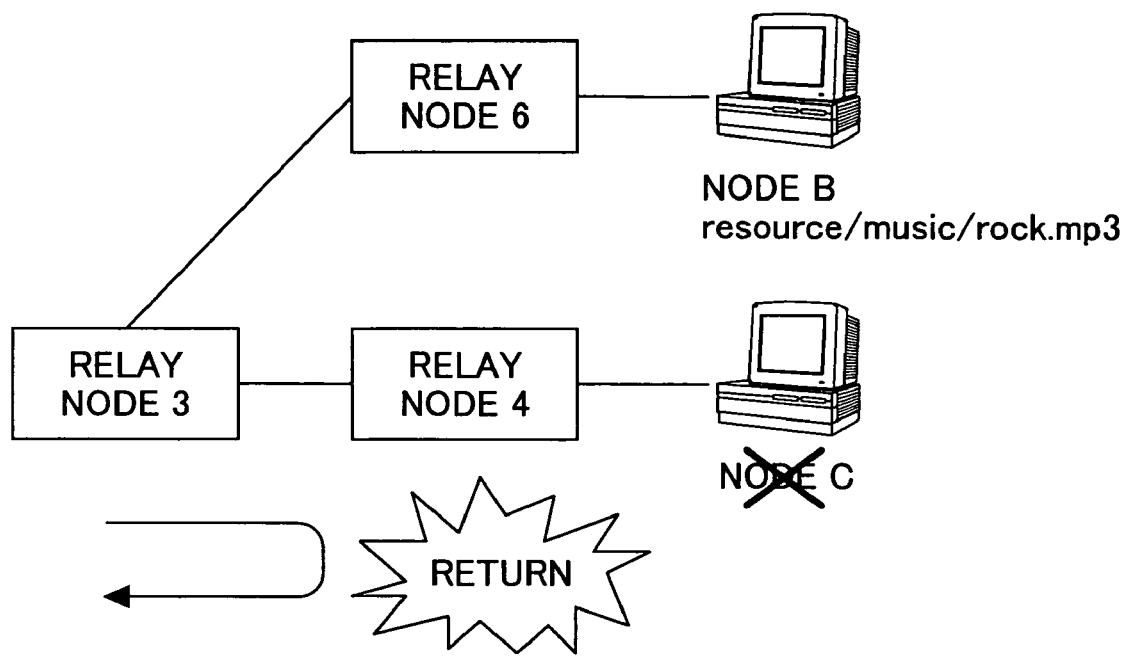
FIG. 4 is a diagram showing an implementation image according to an embodiment of the present invention.

FIG. 4 is a diagram showing an implementation image according to an embodiment of the present invention. In FIG. 4, the followings are assumed.

Assumption 1: the node C becomes a closed node, which is a node that does not provide the resource or the service. As a result, "resource/music/rock.mp3" as a resource opened by the node C becomes closed to the public.

Assumption 2: in a state shown in FIG. 4, name path information, which is an identification of the resource or the service, is transmitted to the relay node 4 but is not transmitted to other nodes. Thus, the network is still in the unstable state.

In implementation 1, in FIG. 4, the relay node 4 receiving a not-arrived frame, which is a frame that is not be distributed to a node providing the resource or the service, transfers the frame to the relay node 3 having a path toward another node B having the same resource or the same service, again (hereinafter, called "return"), so as to transmit the frame to the node B providing the same resource or the same service as the node C which is the closed node, as a destination. Therefore, it is possible to transfer a query frame being sent to the closed node toward another node. The problem 1 to be solved is overcome.

Moreover, in implementation 2, by additionally providing control information of a name path change to the frame being returned (hereinafter, called return frame), each of the relay nodes 1 through 6 changes its own search table by the name path information concerning the closed node, prior to a periodical exchange of the name path information. Accordingly, each of the relay nodes 1 through 6 is informed that one node becomes the closed node. Thus, the problem 2 to be solved is overcome.

Requirements to realize the implementations 1 and 2 are shown as follows:

Requirement 1: each of the relay nodes 1 through 6 can identify the return frame (in order to realize the implementation 1).

Requirement 2: a path for the return frame can be informed to one of the relay nodes 1 through 6 which received the returned frame (in order to realize the implementation 2). For example, in FIG. 4, the relay node 3, which received the return frame, can recognize that the frame is returned from the relay node 4.

Requirement 3: any one of the relay nodes 1 through 6 can recognize which relay nodes 1 through 6 a query passed through until the one of the relay nodes 1 through 6 (in order to realize the implementation 1). When the frame (query) is returned, the frame traverses through the relay nodes 1 through 6 in a reversed order.

Requirement 4: a search can be conducted with respect to the return frame without a path toward the closed node (in order to realize the implementations 1 and 2). Because it is required to transfer the return frame to a relay node other than a relay node sending the return frame. For example, in FIG. 4, if the relay node 3 transfers the return frame to the relay node 4, the return frame is returned again by the relay node 4. As a result, a loop occurs. Thus, the relay node 3 needs to search for a path other than the relay node 4 returning the return frame from node selections, again. As a result, the relay node 6 is selected.

Figure 5:
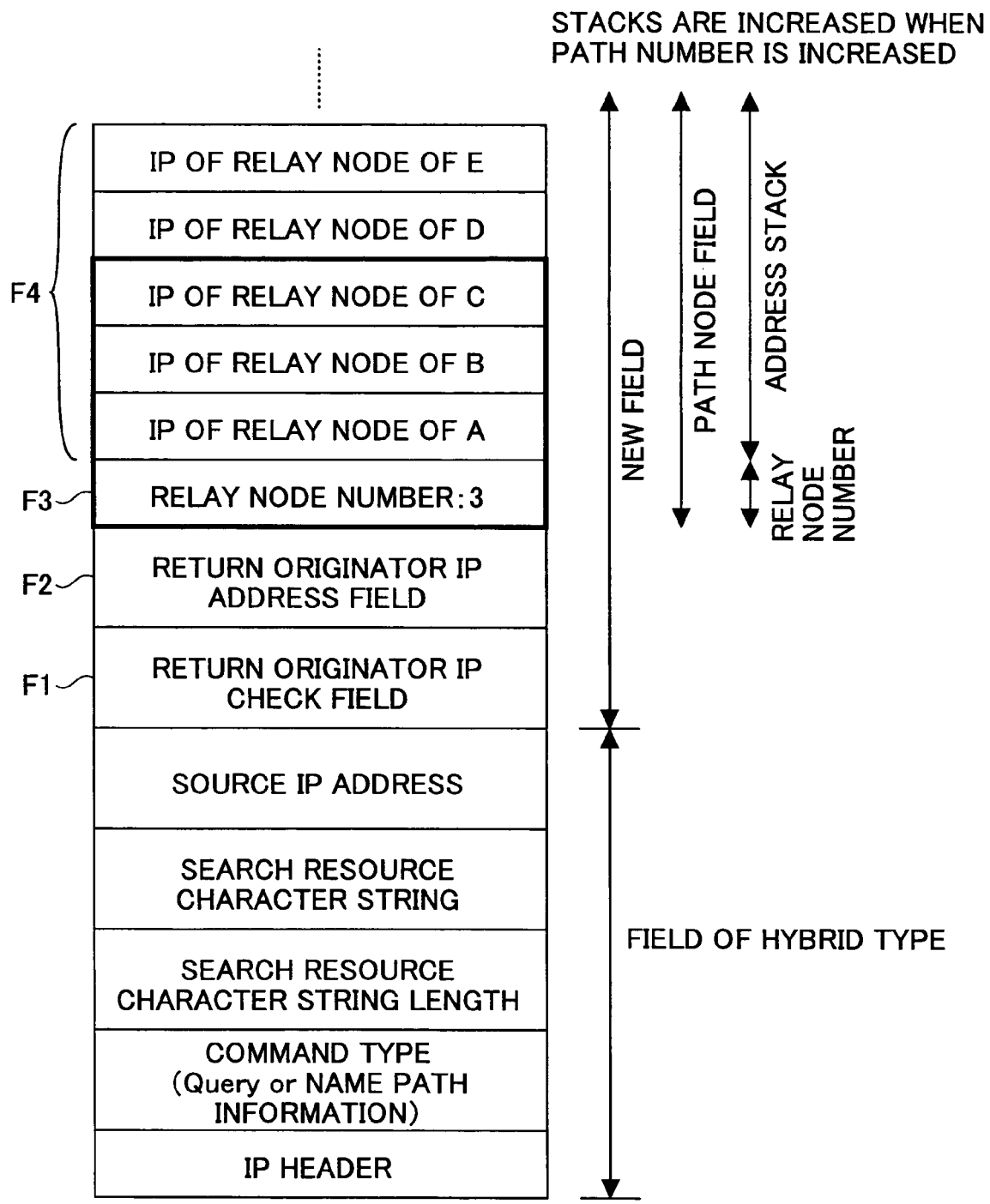
FIG. 5 is a diagram showing a format of a query frame according to the embodiment of the present invention.

FIG. 5 is a diagram showing a format of a query frame according to the embodiment of the present invention. In order to satisfy the requirement 1, as shown in FIG. 5, a return originator IP check field F1 showing whether or not a received frame is the return frame is additionally provided in a query frame (TCP/IP) that is sent and received among nodes. Moreover, in order to satisfy the requirement 2, a return originator IP address field F2 for storing an IP address of a return relay node (relay node returning the frame) of a previous hop is additionally provided in the query frame. The return originator IP address field F2 is valid when the return check field shows "1", that is, this frame is the return frame. The relay node excludes the IP address of the relay node being the previous hop and searches a next node to transfer the return frame.

Moreover, in order to satisfy the requirement 3, as an area for recoding the IP address of each of path nodes through which the frame passed, a path node field is provided in the frame. The path node field includes a relay node number F3 showing the number of the relay nodes being stacked, and an address stack F4 for stacking IP addresses of the path nodes for the number of the relay nodes through which the frame passed.

In general, as shown in FIG. 5, each frame being sent and receive among nodes includes fields for an IP header, a command type (query or name path information), a search resource character string length, a search resource character string, and a source IP address (IP address of a sender). These fields are conventionally provided in a frame of the hybrid type.

Next, a process of each node will be described in detail.

A process conducted by each relay node relaying the query frame before returning the query frame will be described.

(A1) Any relay node identifies "Query" from a command name of a received frame.

(A2) The relay node decomposes a resource name by each delimiter ("/" in this case) that is defined beforehand, searches for a search tree in an order of keys obtained by this decomposition, and is a search result.

(A3) The relay node increments the relay node number F3 shown in FIG. 5 by "1" when the relay node transmits the query frame.

(A4) The relay node stacks its own IP address (IP address of the relay node itself) in a stack row corresponding to the relay node number F3 in the address stack F4.

(A5) The relay node sets its own IP address to the source IP address and sets the search result obtained in (A2) to a destination IP address (IP address of a next receiver). Then, the relay node sends a frame.

A process conducted by each relay node returning the query frame will be described.

(B1) Any relay node identifies "Query" from the command name of a received frame.

(B2) The relay node decomposes the resource name by each delimiter ("/" in this case) that is defined beforehand, searches for the search tree in the order of keys obtained by this decomposition, and does not hit any key in the search tree. In this case, the search result shows "not hit". This search result triggers a return process.

(B3) The relay node writes its own IP address in the return originator IP address field F2.

(B4) The relay node updates the return originator IP check field F1 of the query frame to be "1" showing "return".

(B5) The relay node decrements the relay node number F3 by "1".

(B6) The relay node sets an IP address being stacked in the stack row corresponding to the relay node number F3 in the address stack F4 to be the destination IP address.

(B7) The relay node sets its own IP address to the source IP address, and sends the frame as the return frame.

A process conducted by each relay node receiving the return frame will be described.

(C1) Any relay node identifies "Query" from the command name of a received frame.

(C2) When the relay node receives the return frame, the relay node excludes the IP address shown in the return originator IP address field F2 from a search resource name shown by the research resource character string in the return frame as shown in FIG. 5, and creates the search tree again.

(C3) The relay node decomposes the resource name shown by the resource character string by each delimiter ("/" in this case), and searches the search tree in an order of keys obtained by decomposing the resource name.

(C4) When the relay node obtains the search result (for example, the relay node 3):

(C4a) The relay node 4 in FIG. 4), the relay node releases an instruction of "return" of the return originator IP check field F1.

(C4b) The relay node sets an IP address obtained as the search result to the destination IP address, and sets its own IP address to the source IP address. Then, the replay node sends the return frame.

(C5) When the search result is not obtained, the relay node checks that the relay node number F3 shows more than or equal to "1". When the relay node number F3 shows "0", the relay node itself is a source node to send the query frame. That is, since nodes other than the closed node do not open the resource or the service requested by the query frame in public, the relay node informs a user via an application, which requested to send the query frame, that it failed to find the resource and the service which the user requested.

When the relay node number F3 shows more than or equal to "1" (for example, the relay node 4 in FIG. 4):

(C5a) The relay node writes its own IP address to the return originator IP address field F2.

(C5b) The relay node decrements the relay node number F3 by "1".

(C5c) The relay node sets an IP address being stacked in the stack row corresponding to the relay node number F3 in the address stack F4 to be the destination IP address.

(C5d) The relay node sets its own IP address to the source IP address, and sends the received frame.

Figure 6:
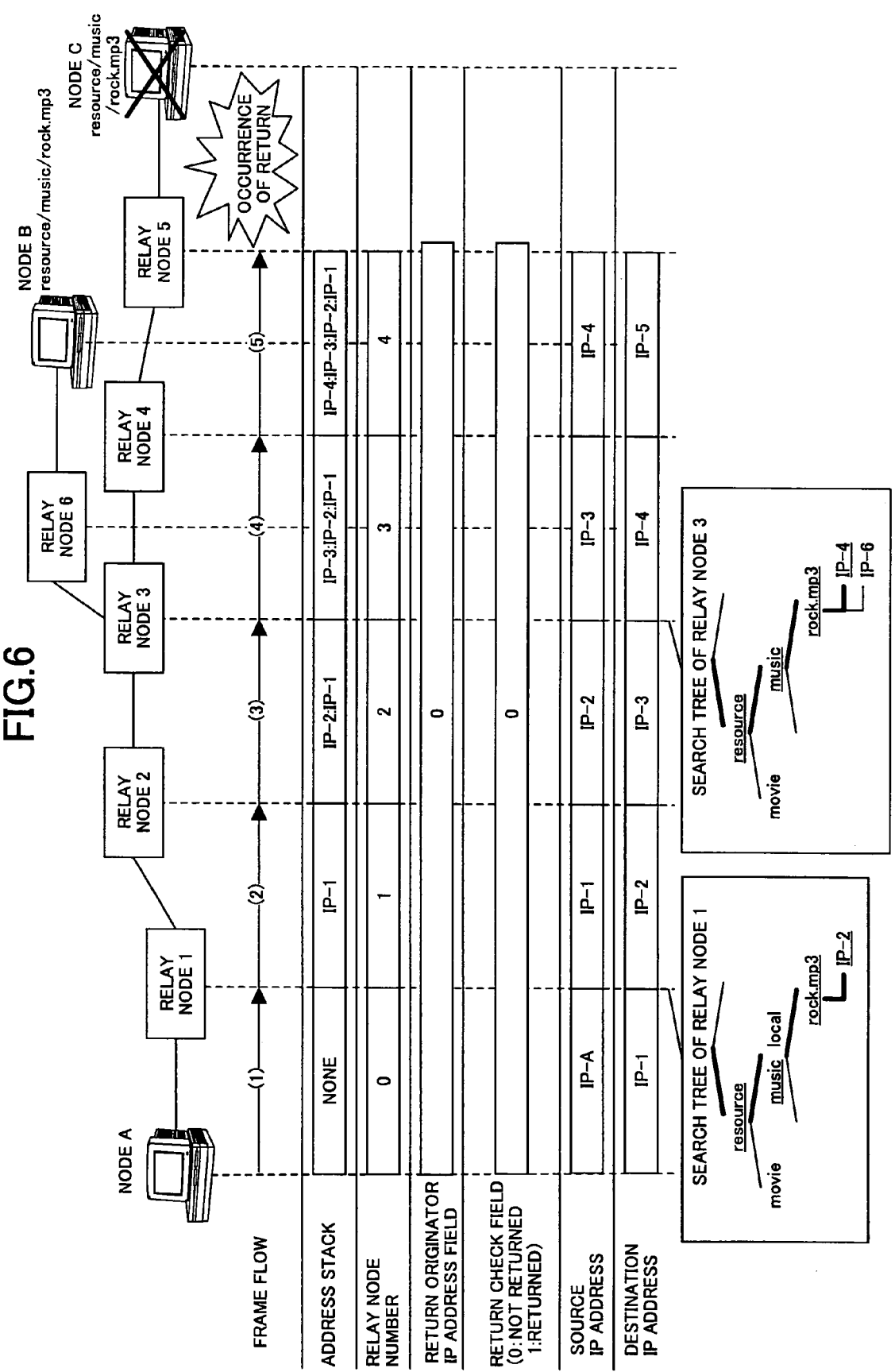
FIG. 6 is a diagram showing a sequence flow for explaining a frame flow in a case in that a frame is returned, according to the embodiment of the present invention.
Figure 7:
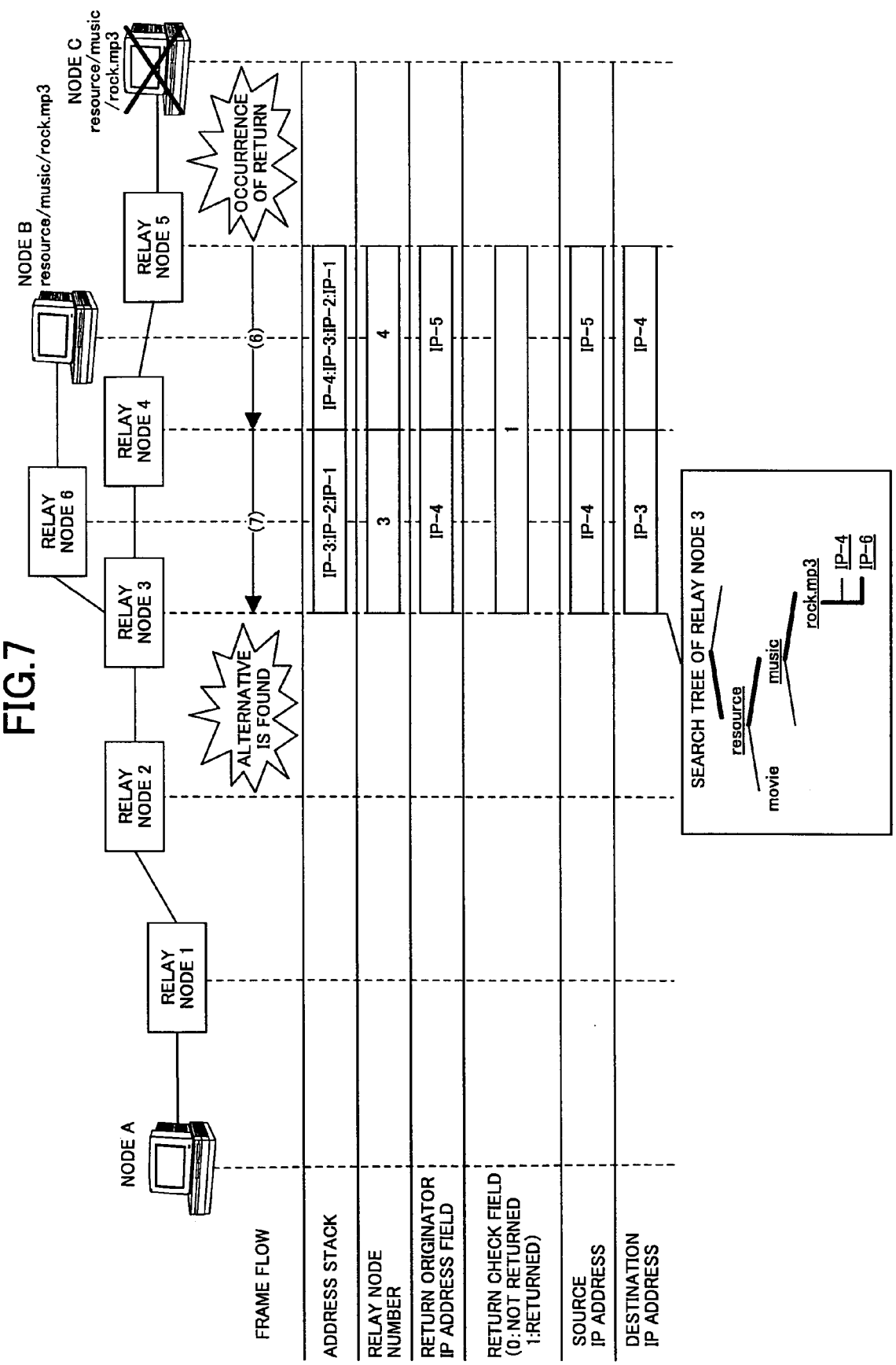
FIG. 7 is a diagram showing the sequence flow for explaining the frame flow in the case in that the frame is returned, according to the embodiment of the present invention.
Figure 8:
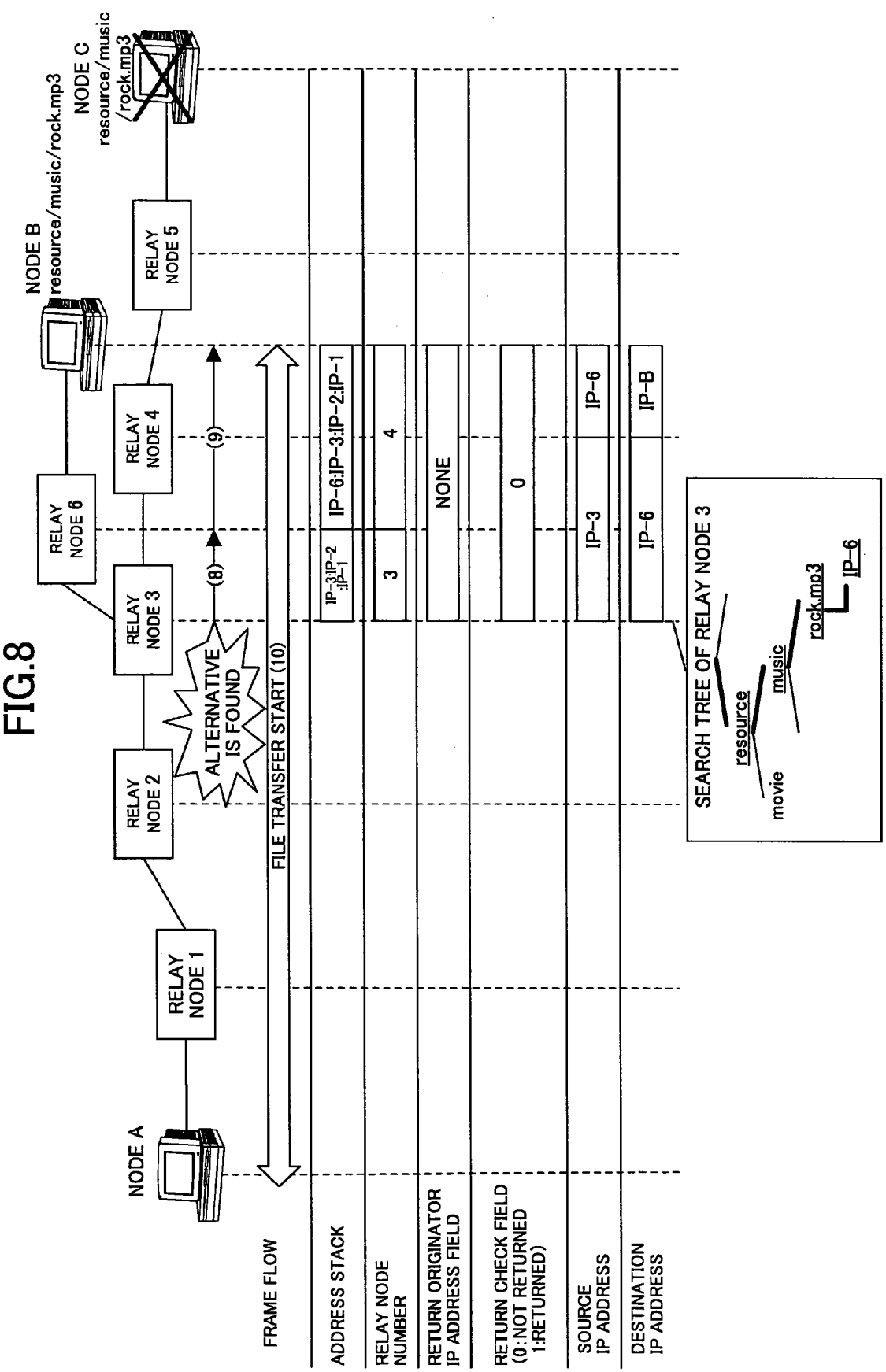
FIG. 8 is a diagram showing the sequence flow for explaining the frame flow in the case in that the frame is returned, according to the embodiment of the present invention.

FIG. 6, FIG. 7, and FIG. 8 are diagrams showing a sequence flow for explaining a frame flow in a case in that a frame is returned, according to the embodiment of the present invention. In FIG. 6, FIG. 7, and FIG. 8, fields of the frame shown in FIG. 5 are shown. Both the node B and the node C open the same file (resource) called "resource/music/rock.mp3". The node A, the node B, the node C, and relay nodes 1 through 6 are mutually communicable by indicating an IP address through a network. Each of the relay nodes 1 through 6 may be a terminal such as a PC or may be a network device such as a router to which an additional function is provided. Name path information is exchanged periodically among the nodes A, B, and C, and the relay nodes 1 through 6. In flowcharts after FIG. 6, "IP-1" represents an IP address of the relay node 1, and IP addresses of the other relay nodes are represented in the same manner. The name path information exchanged between the nodes is described in an order of a source IP, a destination IP, a command name, a resource name, and a next hop IP. In this sequence flow, since the command type always shows "Query", and the search resource character string always shows "resource/music/rock.mp3", those descriptions will be omitted in FIG. 6, FIG. 7, and FIG. 8.

As an assumption, the node C becomes the closed node, and as a result, "resource/music/rock.mp3" opened by the node C is closed in public. In a state shown in FIG. 6, the name path information showing that the node C becomes the closed node is transmitted to the relay node 5 but not transmitted to other relay nodes 1 through 4 and 6. Thus, the network is in an unstable state in that an inconsistency of the name path information occurs in the network. The node B and the node C have "resource/music/rock.mp3". The query frame is sent by the node A (the node A searches for the resource or the service through the network).

(D1) The node A sends the query frame for requesting to find a node having "resource/music/rock.mp3" ((1) in FIG. 6).

(D2) The relay node 1 identifies "Query" from the command name of a received frame. Also, the relay node 1 determines from the return originator IP check field F1 that the received frame is the return frame.

(D3) The relay node 1 decomposes the resource name by each delimiter ("/" in this case) that is defined beforehand, and searches for the search tree in the order of keys obtained by decomposing the resource name.

(D4) Since a next hop in the search result is the relay node 2, the relay node 1 increments the relay node number F3 by "1", stacks "IP-1" showing the relay node 1 in the stack row corresponding to the relay node number F3 in the address stack F4, and transmits the query frame to the relay node 2 ((2) in FIG. 6).

(D5) The relay node 2 conducts a process similarly to (D2), (D3), and (D4), transmits the query frame to the relay node 3 ((3) in FIG. 6).

(D6) The relay node 3 conducts a process similarly to (D2), (D3), and (D4). In this case, there are the relay nodes 4 and 6 as the next hop. The relay node 3 selects one of the relay nodes 4 and 6 by using a certain algorithm (not shown) and sets it to be a search result. It is assumed that the relay node 4 is the search result. The relay node 3 transmits the query frame to the relay node 4 ((4) in FIG. 6).

(D7) The relay node 4 conducts a process similarly to (D2), (D3), and (D4), and transmits the query frame to the relay node 5 ((5) in FIG. 6).

(D8) The relay node 5 conducts a process similarly to (D2) and (D3). However, the node C does not provide the resource or the service, and becomes the closed node. Thus, the relay node 5 cannot obtain the search result and starts the return process.

(D9) The relay node 5 updates the return originator IP check field F1 of the query frame to be "1" showing "return", and writes "IP-5" showing its own IP address to the return originator IP address field F2. In addition, the relay node 5 sets "IP-4" of the IP address shown in the stack row corresponding to the relay node number F3 in the address stack F4 to the destination IP address, and sets its own IP address to the source IP address. Then, the relay node 5 transmits the query frame ((6) in FIG. 7).

(D10) Since the return originator IP check field F1 shows "1", the relay node 4 identifies a received frame as the return frame. The relay node 4 excludes "IP-3" showing the IP address of the relay node 3 in the return originator IP address field F2 from the search resource name shown in the search resource character string in the received frame, and creates the search tree again. With respect to the search tree, the relay node 4 conducts a process similarly to (D2) and (D3). However, since the relay node 4 cannot obtain the search result, the return process is successively conducted.

(D11) The relay node 4 determines that the relay node number F3 shows more than or equal to "1". The relay node 4 decrements the relay node number F3 by "1". The relay node 4 obtains "IP-3" as the IP address of the relay node 3 being stacked in the stack row corresponding to the relay node number F3. The relay node 4 writes "IP-4" as its own IP address to the return originator IP address field F2, and transmits the query frame to "IP-3" showing the IP address of the node 3 ((7) in FIG. 7).

(D12) The relay node 3 determines that a received frame is the return frame since the return originator IP check field F1 shows "1". The relay node 3 excludes "IP-3" showing the IP address of the relay node 3 shown in the return originator IP address field F2 from the search resource shown in the search resource character string in the received frame, and creates the search tree again. With respect to the search tree created again, the relay node 3 conducts a process similarly to (D2) and (D3), and obtains "IP-6" showing the IP address of the relay node 6. Since the relay node 3 obtains the search result, the relay node 3 terminates the return process.

(D13) The relay node 3 changes the instruction showing "return" in the return originator IP check field F1 to be "0" in order to release the return instruction. The relay node 3 sets "IP-6" of the IP address obtained as the search result to the destination IP address, and sets its own IP address to the source IP address. Then, the relay node 3 sends the query frame ((8) in FIG. 8).

(D14) The relay node 6 conducts a process similarly to (D2), (D3), and (D4), and transmits the query frame to the node B ((9) in FIG. 8).

(D15) The node B conducts a process similarly to (D2) and (D3). Since the search result shows its own IP address, that is, the node B itself maintains a search subject to find "resource/music/rock.mp3" as the resource, the node B establishes a TCP connection with "IP-A" shown in the source IP address in the query frame, that, with the node A, and then starts a file transfer ((10) in FIG. 8).

Figure 9:
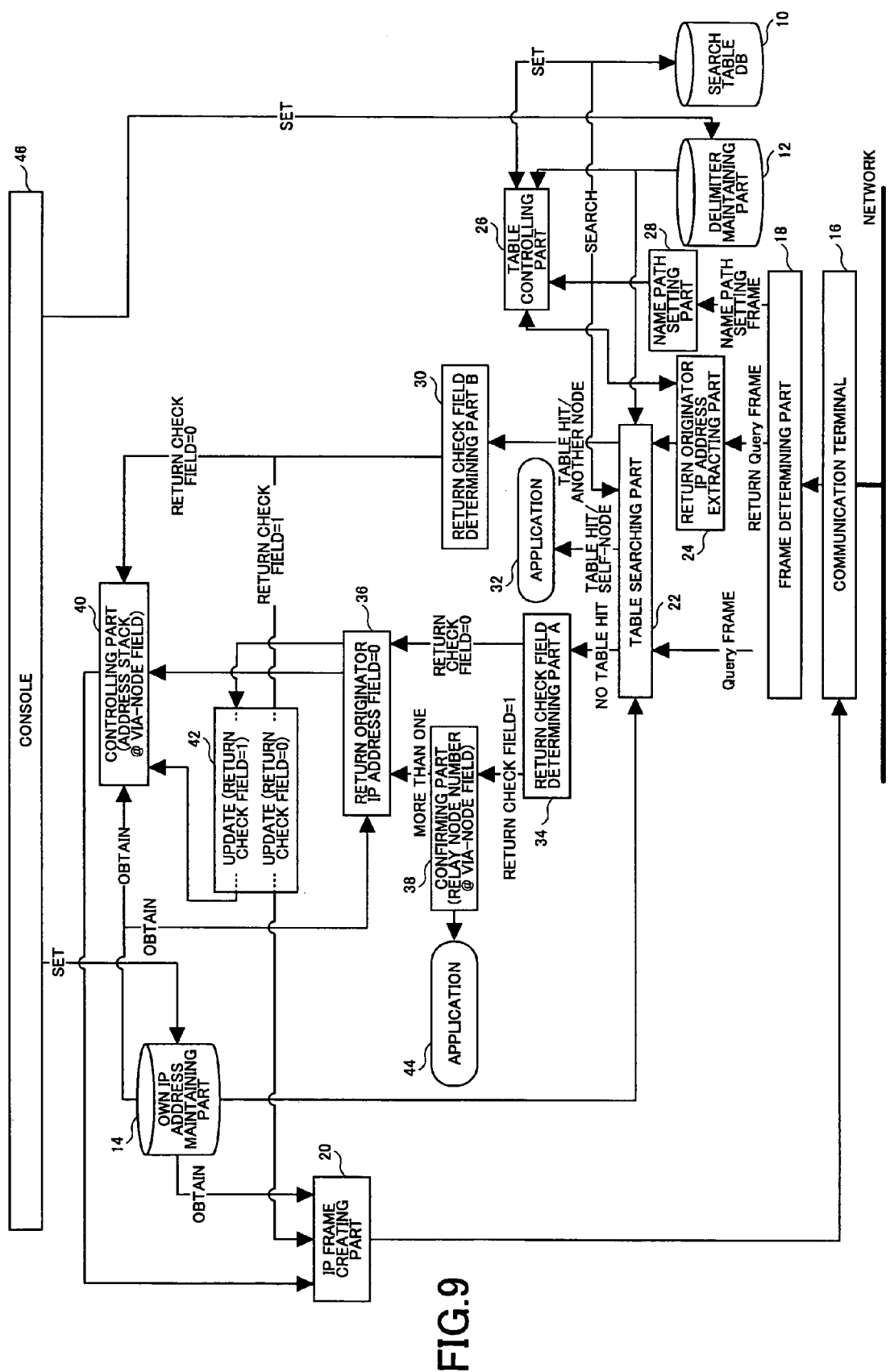
FIG. 9 is a block diagram showing a functional configuration of each relay node according to the embodiment of the present invention.

FIG. 9 is a block diagram showing a functional configuration of each relay node according to the embodiment of the present invention. In FIG. 9, a search table DB 10 is a database including tree information used to search for a next node to transmit the frame from the resource name or the service name.

Figure 10:
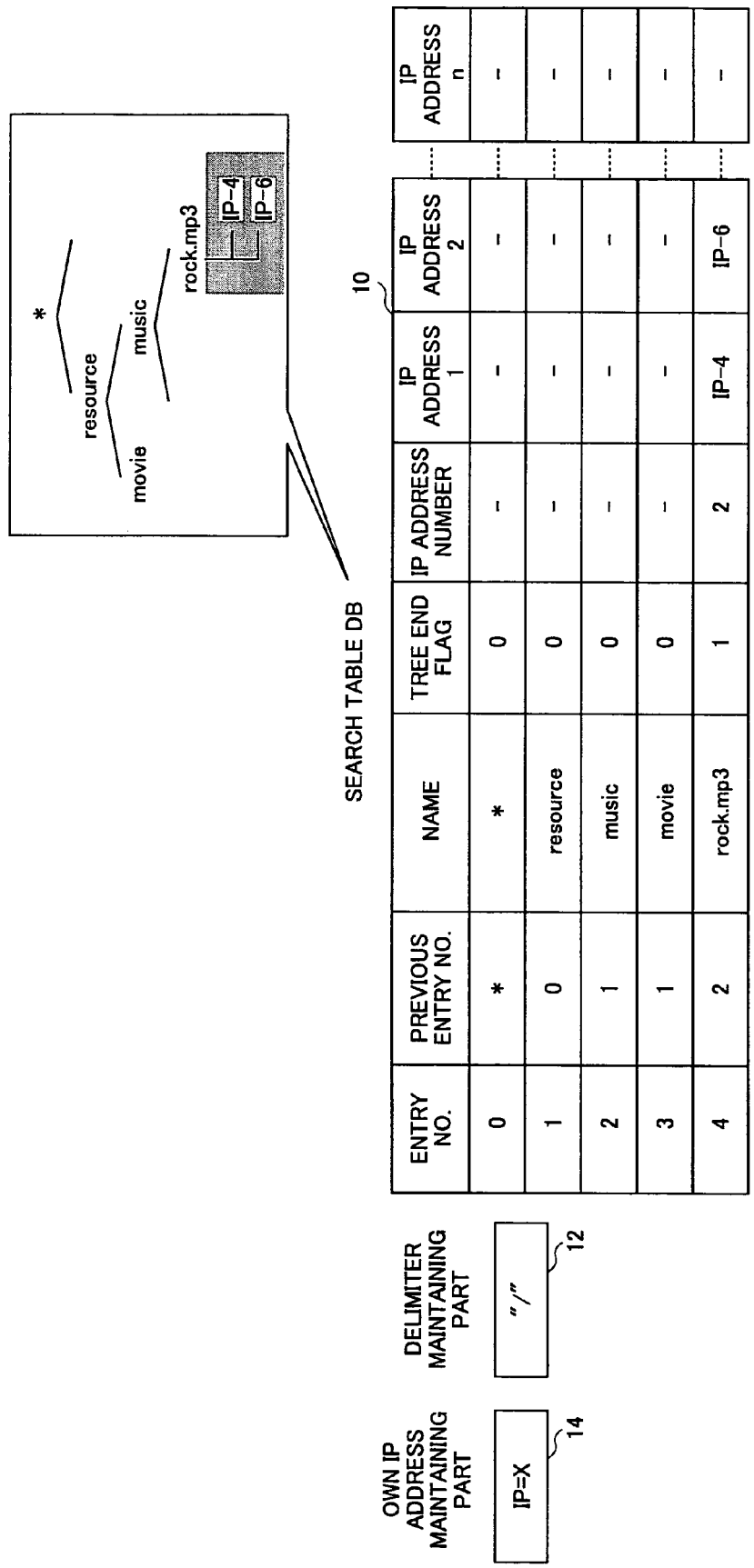
FIG. 10 is a diagram showing a data structure of a search table DB according to the embodiment of the present invention.

As shown in FIG. 10, the search table DB 10 includes an entry number (No.) that is a field showing a unique number for each entry, and a previous entry number of a previous entry before a current entry is searched. By this data structure of the search table DB 10, it is possible to show a tree structure. For each entry, the search table DB 10 includes a name being a character string used for a search and showing a part of the resource name or the service name, a tree end flag ("1" shows the end of the tree, and "0" shows not-end of the tree) showing whether it is necessary to successively conduct a search (middle of branches) or not (end of branches), an IP address number showing the number of IP address possible to be a next transfer node when the tree end flag shows "1", and fields for storing IP addresses for the IP address number.

Moreover, a delimiter maintaining part 12 stores a delimiter used for the resource name and the service name. An own IP address maintaining part 14 stores its own IP address (IP address of a node itself). The delimiter and its own IP address are input from a console 46 and stored, respectively beforehand.

In FIG. 9, a communication terminal 16 electrically terminates a communication received from the network. A frame received from the network is sent to a frame determining part 18 from the communication terminal 16. Also, the communication terminal 16 electrically transmits a frame received from an IP frame creating part 20.

The frame determining part 18 identifies the command type and the returned originator IP check field F1 shown in FIG. 5 in the frame received from the communication terminal 16. The frame determining part 18 determines a next function block as a next processing part to conduct a process, and passes the frame to the next function block. In this case, when the command type shows "Query" (command type=query) and the return originator IP check field F1 shows "1" (return originator IP check field F1=0), that is, when it is determined that the frame is not the return frame, the frame determining part 18 sends the frame to a table searching part 22. When the command type shows "Query" (command type=query) and the return originator IP check field F1 shows "1" (return check field=1), that is, when it is determined that the frame is the return frame, the frame determining part 18 sends the frame to a return originator IP address extracting part 24. Also, when the command type shows the name path information, that is, when it is determined that the frame is to set the name path information (hereinafter, called name path setting frame)), the frame determining part 18 sends the frame to a name path setting part 28, regardless of a value of the return originator IP check field F1.

The return originator IP address extracting part 24 identifies the IP address shown in the return originator IP address field F2 of the frame received from the frame determining part 18, and sends an delete instruction with the search resource character string and the IP address in the return originator IP address field F2 in the frame as arguments, to a table controlling part 26.

The table controlling part 26 searches the search table DB 10, and deletes the IP address indicated by the return originator IP address extracting part 24 from IP addresses of entries having a value "1" of the tree end flag (tree end flag=1) as a search result. Subsequently, the table controlling part 26 decrements an entry of the IP address number by "1". Then, the table controlling part 26 informs the return originator IP address extracting part 24 that an update of the search table DB 10 ends. After that, the return originator IP address extracting part 24 sends the frame to the table searching part 22.

With respect to the table controlling part 26 in response to the name path setting frame supplied from the frame determining part 18, the name path setting part 28 conducts an add/delete instruction for data at that time when the data in the search table DB 10 is structured.

The table controlling part 26 conducts a structure/restructure of the search table DB 10. First, the table controlling part 26 accesses the delimiter maintaining part 12, obtains the delimiter being defined beforehand, decomposes the search resource character string in the frame by each delimiter, and search for the search table DB 10 by traversing the entries by an entry number and a previous entry number as keys. As a result, one of following processes is conducted.

In a case of the delete instruction from the return originator IP address extracting part 24, when the search result is obtained, from the IP addresses of the entries having the value "1" of the tree end flag (tree end flag=1) in the search table DB 10, the table controlling part 26 deletes the IP address indicated by the return originator IP address, the table controlling part 26 decrements the IP address number by "1". Then, the end of a table update is informed to the return originator IP address extracting part 24. On the other hand, when the search result is not be obtained, no update is conducted with respect to the search table DB 10, and the end of the table update is informed to the return originator IP address extracting part 24.

In a case of an add instruction from the name path setting part 28 (process at a table structure), when the search result is obtained, from the IP addresses of the entries having the value "1" of the tree end flag (tree end flag=1), the table controlling part 26 adds an IP address indicated by the name path setting part 28, and the table controlling part 26 increments the IP address number by "1". Then, the end of the table update is informed to the name path setting part 28. On the other hand, when the search result is not obtained, the table controlling part 26 conducts an add process for adding an entry. The table controlling part 26 adds a new entry number to the search table DB 10 from a not-used number, writes a value of the entry number being hit previously to the previous entry number, and the search character string to the name in the search table DB 10. In a case in that the search character string is a last character string segmented by the delimiter (for example, rock.mp3), the table controlling part 26 writes "1" to the tree end flag and the source IP address shown in the frame to an IP address 1 in the search table DB 10.

The table searching part 22 extracts an IP address of a next node to transfer from the query frame received from the frame determining part 18 or the return originator IP address extracting part 24. First, the table searching part 22 accesses the delimiter maintaining part 12, and obtains the delimiter that is defined beforehand. Next, the table searching part 22 decomposes the search resource character string in the frame by each delimiter, and searches the search table DB 10 by traversing the entries registered in the search table DB 10 by the entry number and the previous entry number as keys. As a result, one of the following processes is conducted.

In a case of a table hit, that is in a case in that IP addresses are obtained from the entries having the value "1" of the tree end flag of the search table DB 10 (tree end flag=1), each of the IP addresses is to be a search result. If a plurality of the search results are obtained, a certain algorithm (not shown) is conducted so as to select one of the IP addresses and to be a single search result.

Then, the table searching part 22 obtains the own IP address from the own IP address maintaining part 14, and compares the IP address obtained from the search table DB 10 with the own IP address. When both IP addresses are different from each other (another node), the table searching part 26 sets the IP address of the search result to be the destination IP address used when the IP frame creating part 20. The table searching part 26 sends the frame to a return check field determining part B 30. On the other hand, when both IP addresses are identical (own node), the table searching part 26 sends the resource or the service requested by the query frame to an application 32 in order to establish a TCP session with a source node.

When there is no hit to the search table DB 10, that is, when there is no entry corresponding to the name in the search table DB 10, the table searching part 22 sends the query frame to a return check field determining part A 34.

The return check field determining part A 34 identifies a value of the return originator IP check field F1 of the query frame received from the table searching part 22, and determines a next function block (next processing part) to conduct a process. When the return originator IP check field F1 shows "0" (return originator IP check field F1=0), the return check field determining part A 34 sends the query frame to a return originator IP address field updating part 36. On the other hand, when the return originator IP check field F1 shows "1" (return check field=1), the return check field determining part A 34 sends the query frame to a confirming part 38 for a relay node number@path node field. The relay node number@path node field represents the number of the relay nodes shown in the path node field in the frame.

The return check field determining part B 30 identifies the value of the return originator IP check field F1 of the frame, and determines a next functional block (next processing part) to conduct a process. In this case, a determination rule is different from the return check field determining part A 34. When the return originator IP check field F1 shows "0" (return originator IP check field F1=0), the return check field determining part B 30 sends the frame to a controlling part 40 for an address stack@path node field. On the other hand, when the return originator IP check field F1 shows "1" (return originator IP check field F1=0), the return check field determining part B 30 sends the frame to the return check field updating part 42. The address stack@path node field represents the address stack in the path node field in the frame.

The confirming part 38 for the relay node@path node field identifies the relay node number F3 in the path node field. The following operation is conducted based on an identification result. When the relay node number F3 shows "0" (relay node number F3=0), the own node is the source node of the query frame. Since there is no further destination to return the query frame, the confirming part 38 informs an application 44 that requests sending the query frame. On the other hand, when the relay node number F3 shows more than or equal to "1" (relay node number F3≧1), the confirming part 38 sends the frame to the return originator IP address field updating part 36.

The return check field updating part 42 changes the value of the return originator IP check field F1. The return check field updating part 42 changes the value of the return originator IP check field F1 from "0" to "1", and sends the frame to the controlling part 40 for the address stack@path node field. In addition, The return check field updating part 42 changes the value of the return originator IP check field F1 from "1" to "0", and sends the frame to the IP frame creating part 20.

The return originator IP address field updating part 36 obtains its own IP address from the own IP address maintaining part 14, updates the return originator IP address field F2 in the frame to be its own IP address, and sends the frame to the controlling part 40 for the address stack@path node field.

The controlling part 40 for the address stack@path node field conducts the following processes with respect to the path node field in the frame. When the controlling part 40 receives the frame from the return check field determining part B 30, the controlling part 40 increments the relay node number by "1", and stacks its own IP address obtained from the own IP address maintaining part 14 to the stack row corresponding to the relay node number F3 in the address stack F4. In addition, the controlling part 40 informs the IP address obtained by the table searching part 22 as the destination IP address to the IP frame creating part 20, and sends the frame to the IP frame creating part 20. It should be noted that the controlling part 40 does not obtain the IP address of a next transfer destination from the path address field.

Moreover, when the frame is received from the return originator IP address field updating part 36, the controlling part 40 for the address stack@path node field decrements the relay node number F3 by "1", and obtains the IP address being stacked in the stack row corresponding to the relay node number F3 in the address stack F4. Then, the controlling part 40 informs the IP address as the destination IP address to the IP frame creating part 20, and sends the frame to the IP frame creating part 20.

Furthermore, when the frame is received from the return check field updating part 42, the controlling part 40 for the address stack@path node field obtains the IP address being stacked in the stack row corresponding to the relay node number F3 in the address stack F4. Then, the controlling part 40 informs the IP address as the destination IP address to the IP frame creating part 20, and sends the frame to the IP frame creating part 20.

The IP frame creating part 20 obtains the source IP address and the destination IP address, and creates an IP frame. The IP frame creating part 20 obtains the source IP address from the own IP address maintaining part 14. A pattern of the destination address is shown as follows. When there is no hit at the table searching part 22, the IP frame creating part 20 uses the IP address that is obtained by the controlling part 40 for the address stack@path node field and stacked in the path node field. When there is a hit at the table searching part 22, the IP frame creating part 20 uses the IP address obtained from the search table DB 10.

The console 46 is an interface for handling an input and an output by a user to set the delimiter to the delimiter maintaining part 12 and its own IP address to the own IP address maintaining part 14.

Figure 11:
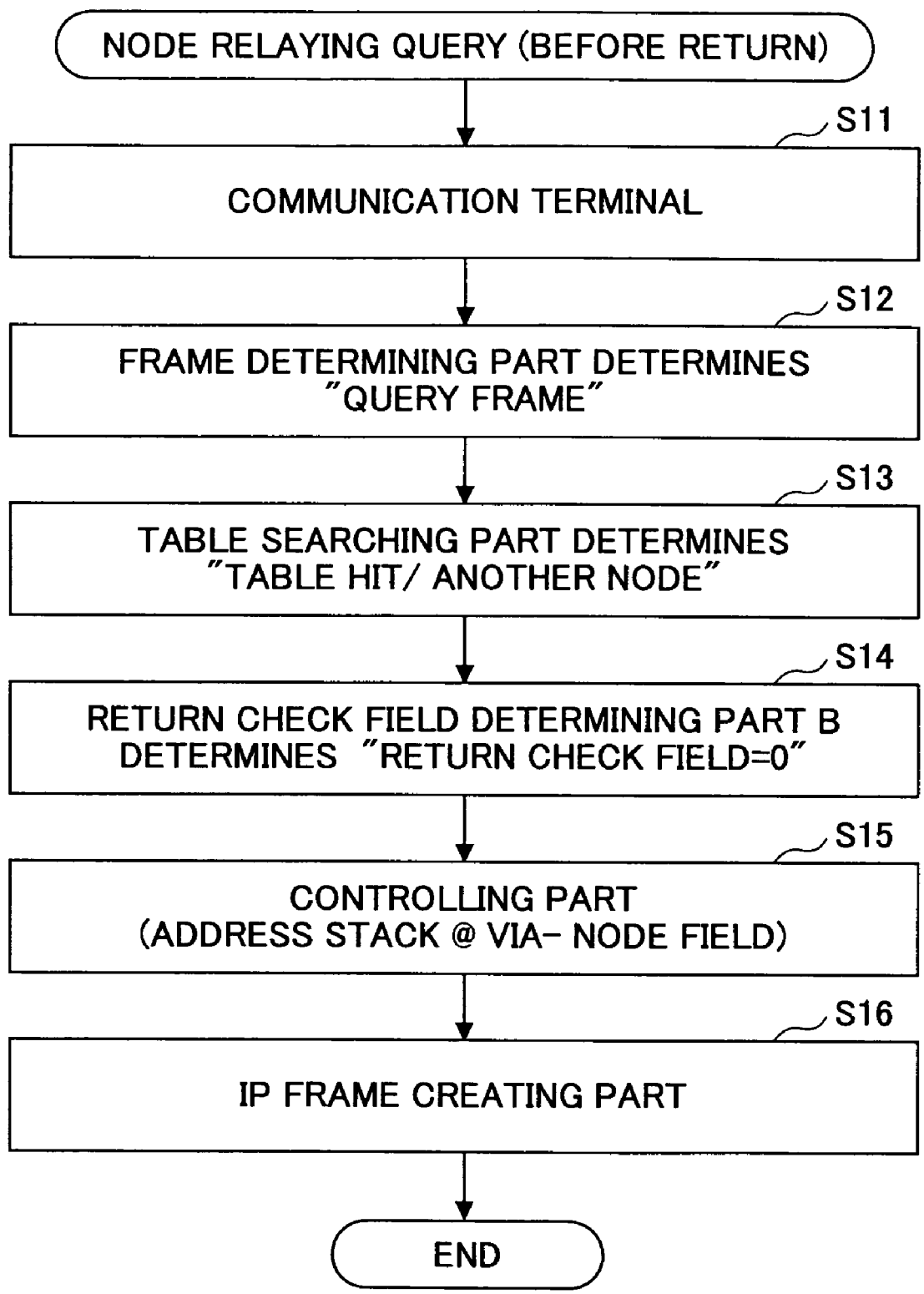
FIG. 11 is a flowchart for explaining a sequence of blocks through which a query frame is processed at each relay node relaying the query frame before the query frame is returned, according to the embodiment of the present invention.

FIG. 11 is a flowchart for explaining a sequence of blocks through which the query frame is processed at each relay node relaying the query frame before the query frame is returned, according to the embodiment of the present invention. In FIG. 11, in step S11, the communication terminator 16 receives the frame from the network. In step S12, the frame determining part 18 determines that the frame being received is the query frame. In step S13, the table searching part 22 determines that there is a table hit and another node provides the resource or the service.

Next, in step S14, the returned check field determining part B 30 determines that the return check field F1 shows "0" (return check field F1=0). In step S15, the controlling part 40 for for the address stack@path node fields increments the relay node number F3 in the frame by "1", stacks its own IP address to the stack row corresponding to the relay node number F3 in the address stack F4, and sets the IP address obtained by the table searching part 22 as the destination IP address. In step S16, the IP frame creating part 20 creates an IP frame and sends out the IP frame from the communication terminator 16 to the network.

Figure 12:
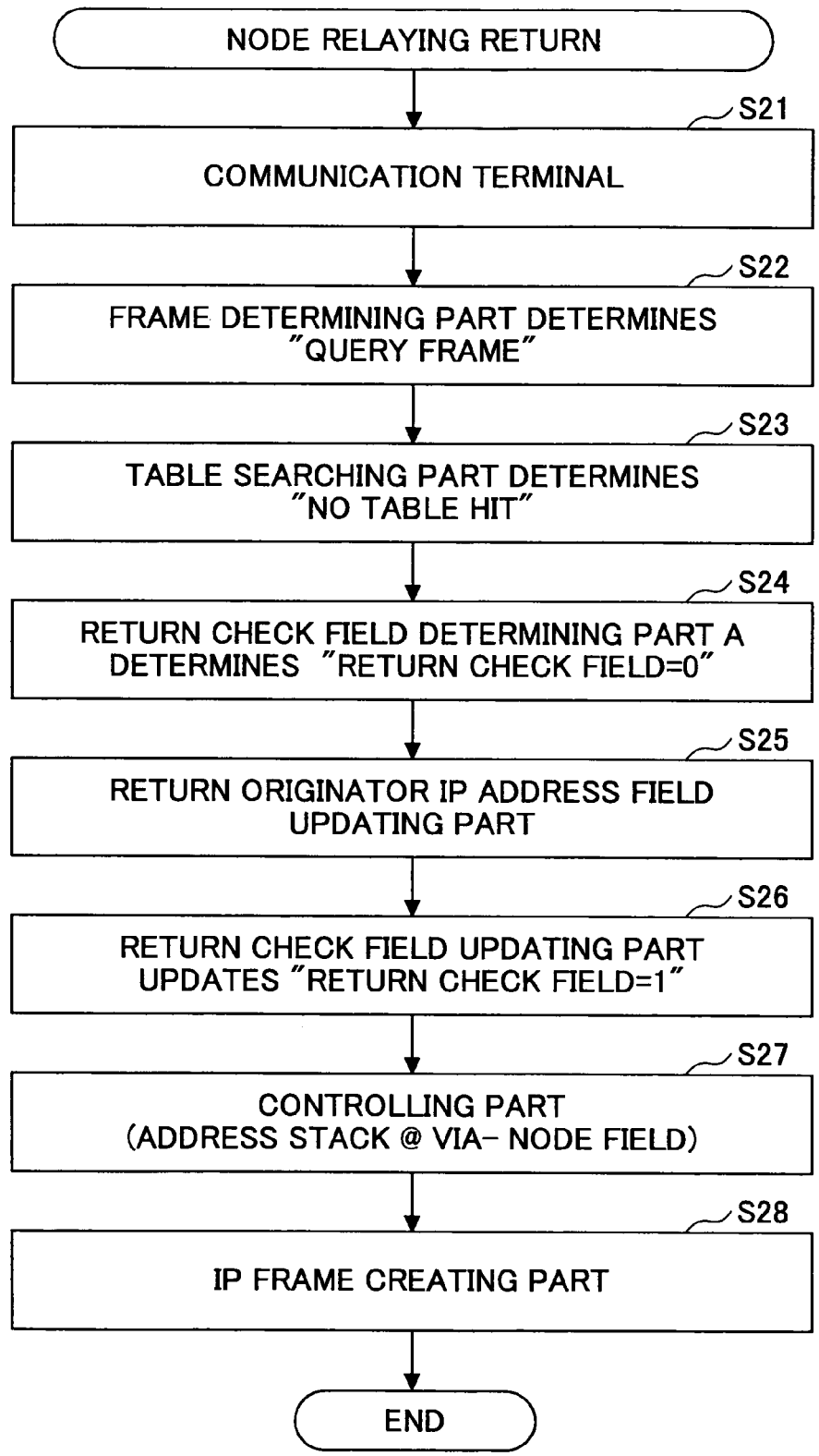
FIG. 12 is a flowchart for explaining a sequence of blocks through which the query frame is processed to return at each relay node relaying the query frame, according to the embodiment of the present invention.

FIG. 12 is a flowchart for explaining a sequence of blocks through which the query frame is processed to return at each relay node relaying the query frame, according to the embodiment of the present invention. In FIG. 12, in step S21, the communication terminator 15 receives the frame from the network. In step S22, the frame determining part 18 determines that the frame being received is the query frame. In step S23, the table searching part 22 determines that there is no table hit.

Next, in step S24, the return check field determining part A 34 determines that the return check field F2 in the received frame shows "0" (return check field F2=0). In step S25, the return originator IP address field updating part 36 updates the return originator IP address field F2 in the received frame to show its own IP address. In step S26, the return check field updating part 42 updates the return originator IP check field F1 in the received frame to be "1" (return originator IP check field F1=1). In step S27, the controlling part 40 for an address stack@path node field sets the IP address being stacked in the stack row corresponding to the relay node number F3 in the address stack F4. In step S28, the IP frame creating part 20 creates a IP frame and sends out the IP frame from the communication terminator 16 to the network.

Figure 13:
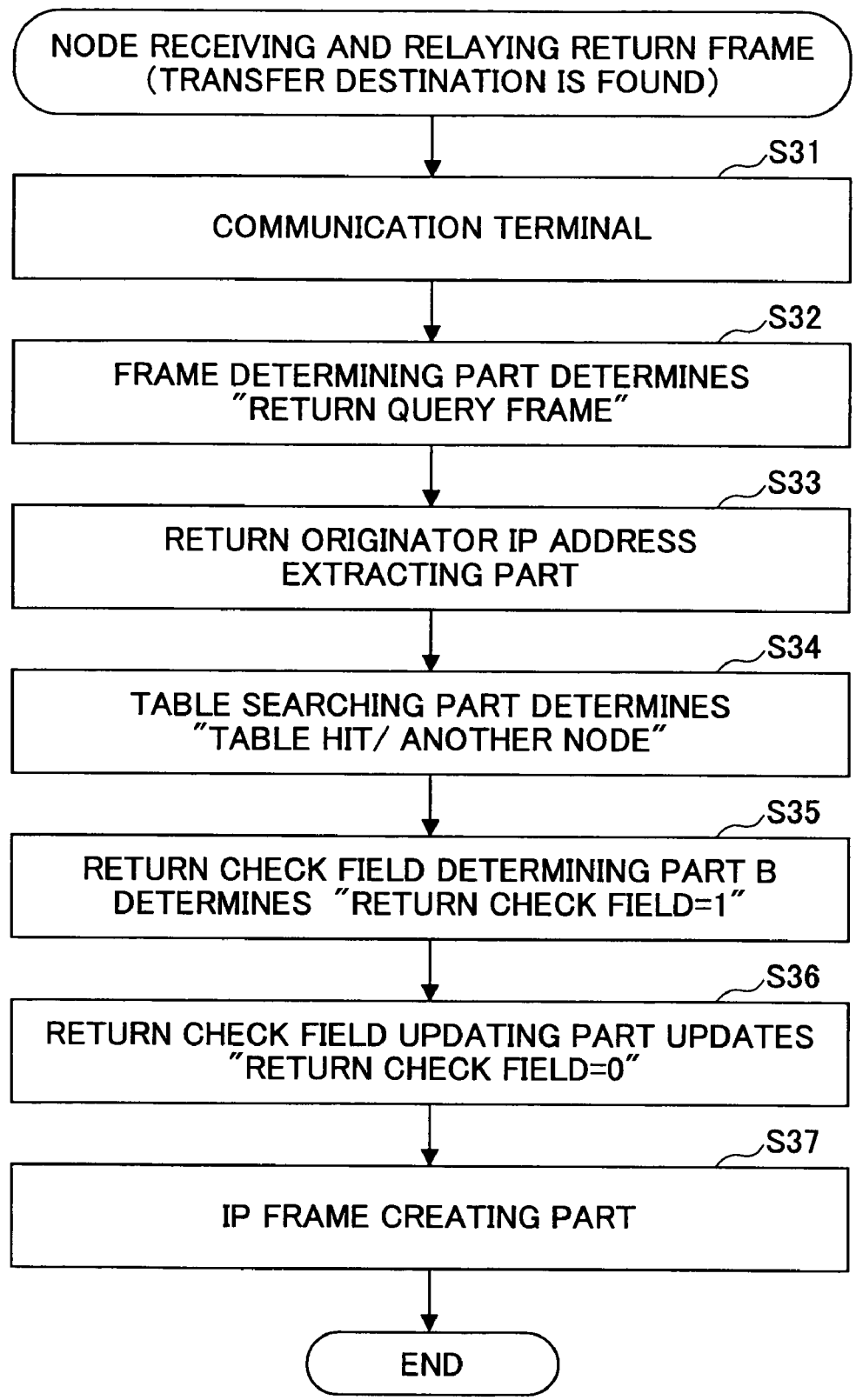
FIG. 13 is a flowchart for explaining a sequence of blocks through which the query frame is processed at each relay node relaying the query frame in a case in that a transfer destination is found, according to the embodiment of the present invention.

FIG. 13 is a flowchart for explaining a sequence of blocks through which the query frame is processed at each relay node relaying the query frame in a case in that a transfer destination is found, according to the embodiment of the present invention. In FIG. 13, in step S31, the communication terminator 16 receives the frame from the network. In step S32, the frame determining part 18 determines that a received frame is the return frame (query frame being returned). In step S33, the return IP address extracting part 24 identifies the IP address shown in the return originator IP address field F2 in the received frame, and issues a delete instruction. In step S34, the table searching part 22 determines that there is a table hit and another node provides the resource or the service (that is, the transfer destination is found).

Next, in step S35, the return check field determining part B 30 determines that the return originator IP check field F1 shows "1" (return originator IP check field F1=1). In step S36, the return check field updating part 42 updates the return originator IP check field F1 in the received frame to show "0" (return originator IP check field F1=0). In step S37, the IP frame creating part 20 creates an IP frame and sends out the IP frame from the communication terminator 16 to the network.

Figure 14:
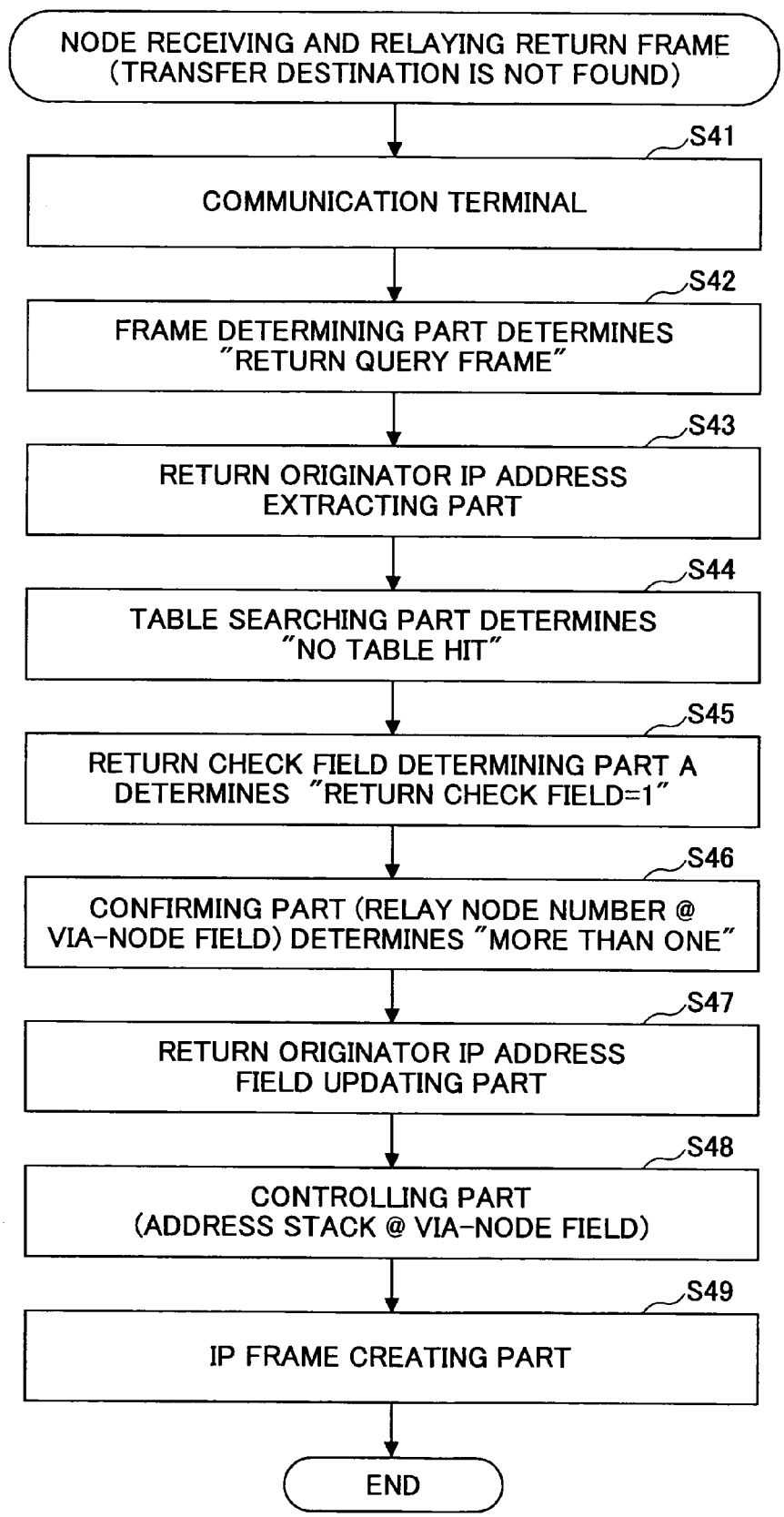
FIG. 14 is a flowchart for explaining a sequence of blocks through which the query frame is processed at each relay node receiving the return frame in a case in that the transfer destination is not found, according to the embodiment of the present invention.

FIG. 14 is a flowchart for explaining a sequence of blocks through which the query frame is processed at each relay node receiving the return frame in a case in that the transfer destination is not found, according to the embodiment of the present invention. In FIG. 14, in step S41, the communication terminator 16 receives the frame from the network. In step S42, the frame determining part 18 determines that a received frame is the return frame (query frame being returned). In step S43, the return IP address extracting part 24 identifies the IP address shown in the return originator IP address field F2 in the received frame, and issues the delete instruction. In step S44, the table searching part 22 determines that there is no table hit.

Next, in step S45, the return check field determining part A 34 determines that the return originator IP check field F1 in the received frame shows "1" (return originator IP check field F1=1). In step S46, the confirming part 38 for the relay node@path node field determines that the relay node number F3 is more than or equal to "1". In step S47, the return originator IP address field updating part 36 updates the return originator IP address field F2 to show its own IP address. In step S48, the controlling part 40 for an address stack@path node field decrements the relay node number F3 by "1", obtains the IP address being stacked in the stack row corresponding to the relay node number F3 in the address stack F4, and sets the IP address to the source IP address in the received frame. In step S49, the IP frame creating part 20 creates an IP frame and sends out the IP frame from the communication terminator 16 to the network.

Figure 15:
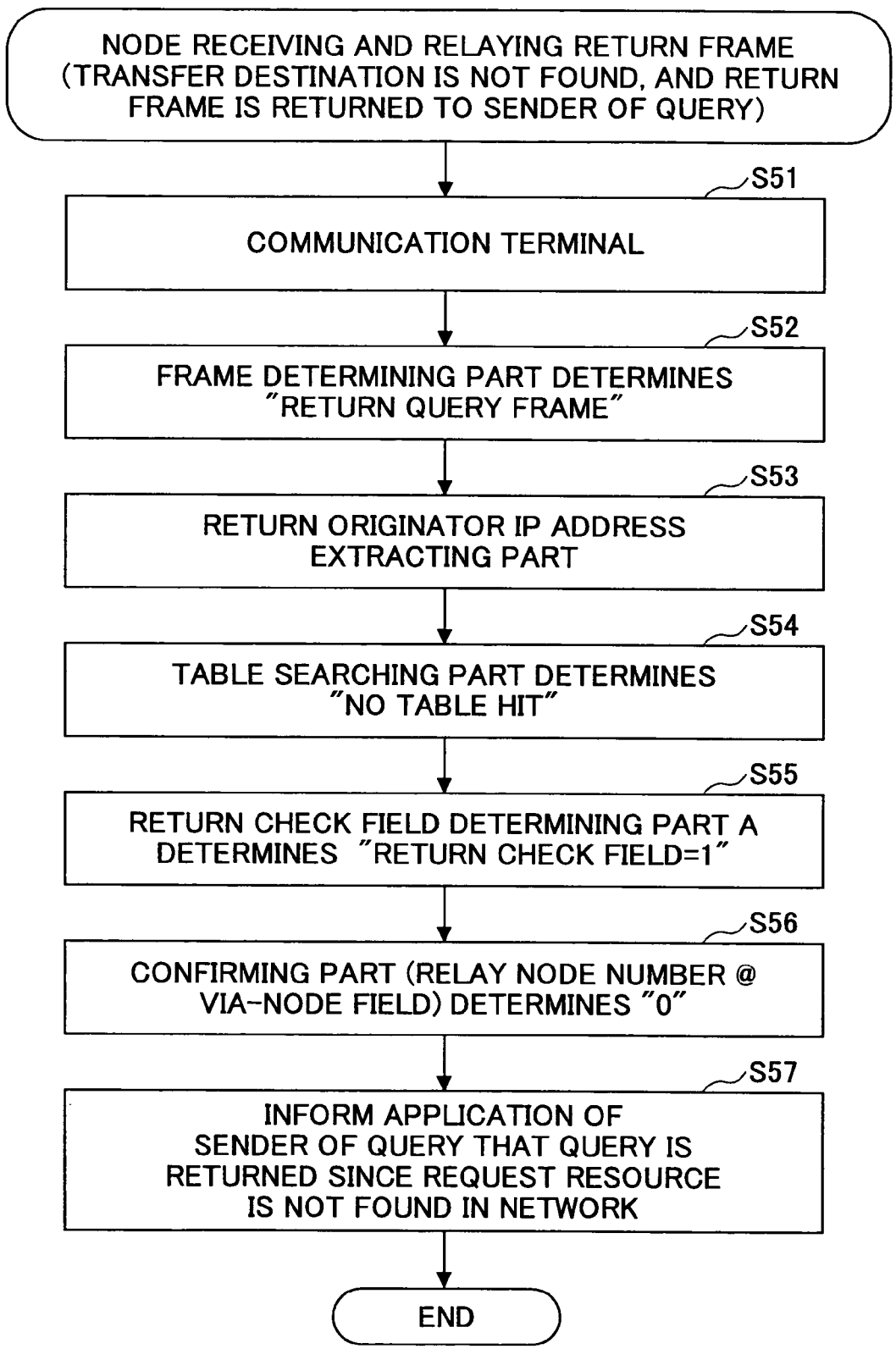
FIG. 15 is a flowchart for explaining a sequence of blocks through which the query frame is processed at each relay node receiving the return frame in a case in that the transfer destination is not found and the query frame is return as the return frame to the originator, according to the embodiment of the present invention.

FIG. 15 is a flowchart for explaining a sequence of blocks through which the query frame is processed at each relay node receiving the return frame in a case in that the transfer destination is not found and the query frame is return as the return frame to the originator, according to the embodiment of the present invention. In FIG. 15, in step S51, the communication terminator 16 receives the frame from the network. In step S52, the frame determining part 18 determines that a received frame is the return frame (query frame being returned). In step S53, the return IP address extracting part 24 identifies the IP address shown in the return originator IP address field F2 in the received frame, and issues the delete instruction. In step S54, the table searching part 22 determines that there is no table hit.

Next, in step S55, the return check field determining part A 34 determines that the return originator IP check field F1 in the received frame shows "1" (return originator IP check field F1=1). In step S56, the confirming part 38 for the relay node@path node field determines that the relay node number F3 is more than or equal to "0". In step S57, the confirming part 38 informs the application 44 being a request originator of the query frame that the resource or the service requested by the query frame is not available through the network and the query frame is returned.

Figure 16:
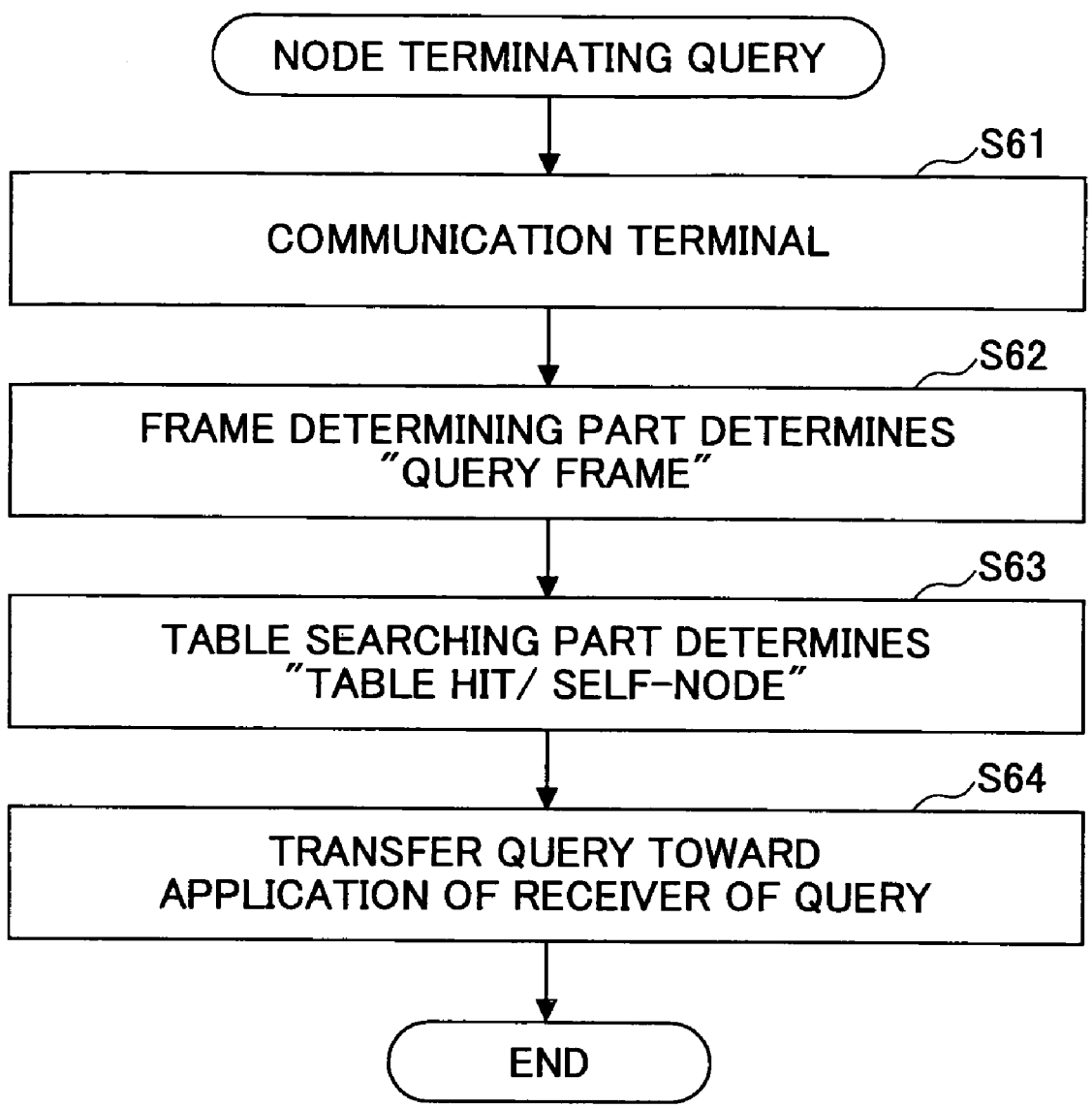
FIG. 16 is a flowchart for explaining a sequence of blocks through which the query frame is processed at each relay node terminating the query frame, according to the embodiment of the present invention.

FIG. 16 is a flowchart for explaining a sequence of blocks through which the query frame is processed at each relay node terminating the query frame, according to the embodiment of the present invention. In FIG. 16, in step S61, the communication terminator 16 receives the frame from the network. In step S62, the frame determining part 18 determines that the frame is the query frame. In step S63, the table searching part 22 determines that there is a table hit and the own node provides the resource or the service. In step S64, the table searching part 22 transfers the query frame to an application that is a receiver to receive the query frame.

In this embodiment, the return check field updating part 42 corresponds to a return check field updating part cited in claims, the controlling part 40 for an address stack@path node field corresponds to an address stacking part cited in claims, the return originator IP address extracting part 24 corresponds to a stack address extracting part cited in claims, the return originator IP address field updating part 36 corresponds to a return originator address updating part cited in claims, and the table controlling part 26 corresponds to a table controlling part.

Regarding Japanese Laid-open Patent Application No. 10-70552 considering registrations of the extended address and the closed address, a concept to return a data frame at the relay node and any technology related to this concept are not disclosed. In addition, regarding Japanese Laid-open Patent Application No. 2001-203739, it is assumed that a destination is only one node, and the concept to return a data frame at the relay node and any technology related to this concept are not disclosed.

According to the present invention, it is possible to transfer an access request being sent to a closed node, which stops providing a resource or a service, to another node providing the same resource or the same service. Accordingly, instead of waiting for a periodical exchange of identifications, it is possible to inform each relay node that a node becomes the closed node.

The present invention is not limited to the specifically disclosed embodiments, and variations and modifications may be made without departing from the scope of the invention.

The present application is based on Japanese Priority Application No. 2004-203676 filed on Jul. 9, 2004, the entire contents of which are hereby incorporated by reference.

What is claimed is:

1. A method for finding a resource or a service performed in a relay node relaying a frame, the method comprising:
   maintaining a search table to register more than one relay node available to provide the resource or the service and corresponding information identifying the resource or the service;
   receiving an access request for the resource or the service, the access request including identification information associating a first relay node with the resource or the service that had been requested and status information indicating that the first relay node has stopped providing the resource or the service, the access request which does not indicate a second relay node that is available to provide the resource or the service that is no longer provided by the first relay node;
   searching, in response to the status information, the search table using the identification information to identify the second relay node that is available to provide the requested resource or the service;
   switching from the first relay node to the second relay node;
   searching the search table based on the identification information indicated in the access request when the access request for obtaining the resource or the service is received from a request node; and
   accessing an available node providing the resource or the service,
   wherein the resource or the service is public and managed by the relay nodes, and the identification information associating the resource or the service with network addresses of the relay nodes is exchanged among the relay nodes.

2. The method as claimed in claim 1, wherein information showing that the first relay node providing the resource or the service has stopped providing the resource or the service is included in the access request, each of the relay nodes is informed by the access request that the first relay node providing the resource or the service has stopped providing the resource or the service, so that the relay nodes change the search table.

3. A relay node apparatus comprising:
   a computer having computer-readable instructions embodied on a computer readable medium, the instructions when executed by the computer causes the computer to operate as the relay node apparatus and the relay node apparatus includes:
   a return check field updating part configured to write a return instruction usable for switching from a first relay node apparatus that has stopped providing a resource or a service to a second relay node apparatus that is available to provide the resource or the service in order to transfer an access request when a search result is not obtained by searching for a search table in response to the access request since the first relay node apparatus has stopped providing the resource or the service, the access request indicating the resource or the service but not indicating another relay node apparatus that is available to provide the resource or the service;
   an address stacking part configured to stack an own address of the relay node apparatus when the access request being transferred does not include a return instruction; and
   a stack address extracting part configured to extract a transfer originator from the access request being transferred when the access request being transferred includes the return instruction from the transfer originator,
   wherein the stack address extracting part is configured to extract a network address of a relay node apparatus as the transfer originator, the network address being stacked in the access request, and to delete the network address of the relay node apparatus being extracted, and
   wherein the resource or service is public and managed by the relay node apparatuses, and identification information identifying each of the resource or the service and the network address of each of the relay node apparatuses available to provide the resources or the services are exchanged with other relay node apparatuses relaying the identification information and the network addresses.

4. The relay node apparatus as claimed in claim 3, further comprising:
   a return originator address updating part configured to write an own address as a return originator address when the access request including the return instruction is being transferred.

5. The relay node apparatus as claimed in claim 4, further comprising:
   a table controlling part configured to delete the return address shown in the access request including the return instruction from the search table.

6. The relay node apparatus as claimed in claim 5, further comprising:
   a table searching part configured to search for the search table based on identification information included in the access request, wherein the table searching part searches for the search table after the return address is deleted from the search table.

7. A computer-readable medium storing executable instructions, which when executed by a computer, causes the computer to perform:

maintaining a search table to register more than one relay node available to provide a resource or a service and corresponding identification information identifying the resource or the service;

receiving an access request for the resource or the service, the access request including identification information associating a first relay node with the resource or the service that had been requested and status information indicating that the first relay node has stopped providing the resource or the service, the access request not indicating a second relay node that is available to provide the resource or the service no longer provided by the first relay node;

searching, in response to the status information, the search table using the identification information to identify the second relay node that is available to provide the requested resource or the service;

switching from the first relay node to the second relay node;

searching the search table based on the identification information indicated in the access request when the access request for obtaining the resource or the service is received from a request node; and accessing an available node providing the resource or the service.

* * * * *